(12) United States Patent
Iwasaki et al.

(10) Patent No.: US 7,433,173 B2
(45) Date of Patent: Oct. 7, 2008

(54) MULTILAYER CERAMIC CAPACITOR AND METHOD FOR MANUFACTURING THE SAME

(75) Inventors: Kenichi Iwasaki, Kirishima (JP);
Daisuke Fukuda, Kirishima (JP);
Masahiro Nishigaki, Kirishima (JP);
Kiyoshi Matsubara, Kirishima (JP);
Kousei Kamigaki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 268 days.

(21) Appl. No.: 11/285,462

(22) Filed: Nov. 22, 2005

(65) Prior Publication Data

US 2006/0114641 A1    Jun. 1, 2006

(30) Foreign Application Priority Data

| Nov. 25, 2004 | (JP) | ............................. 2004-340347 |
| Dec. 22, 2004 | (JP) | ............................. 2004-371317 |
| Dec. 24, 2004 | (JP) | ............................. 2004-373173 |
| Dec. 24, 2004 | (JP) | ............................. 2004-373180 |
| Dec. 24, 2004 | (JP) | ............................. 2004-373181 |

(51) Int. Cl.
*H01G 4/06* (2006.01)

(52) U.S. Cl. .................................. 361/321.4; 361/321.5

(58) Field of Classification Search .................. 361/311, 361/321.1, 321.2, 321.3, 321.4, 321.5; 501/137–139
See application file for complete search history.

(56) References Cited

U.S. PATENT DOCUMENTS

| 7,057,876 B2 * | 6/2006 | Fujioka et al. ........... 361/321.4 |
| 2004/0178436 A1 | 9/2004 | Baniecki et al. |
| 2006/0023399 A1 * | 2/2006 | Fujioka et al. ........... 361/321.2 |

FOREIGN PATENT DOCUMENTS

| JP | 11-157928 | 6/1999 |
| JP | 2002-284571 | 10/2002 |
| JP | 2003-040671 | 2/2003 |
| JP | 2004-262717 | 9/2004 |
| JP | 2004-281446 | 10/2004 |

* cited by examiner

*Primary Examiner*—Eric Thomas
(74) *Attorney, Agent, or Firm*—Hogan & Hartson LLP

(57) ABSTRACT

Provided is a multilayer ceramic capacitor having a capacitor body formed by alternately laminating a dielectric layer and an internal electrode layer, and an external electrode formed on both ends of the capacitor body. The dielectric layer has at least two type of barium titanate crystal grains that differ from one another in at least one selected from Ca composition concentration, Sr composition concentration, and Zr composition concentration, and a grain boundary phase. If this multilayer ceramic capacitor employs, as a dielectric layer, a dielectric ceramic that contains barium titanate crystal grains in which part of Ba is substituted by Ca, Sr, or Zr, it is capable of suppressing the grain growth of crystal grains, and improving relative dielectric constant, temperature characteristic, and high-temperature load test characteristic, for example, in high-volume manufacturing using a tunnel type large kiln.

19 Claims, 4 Drawing Sheets

Fig. 3(b)  Equivalent circuit for analysis

US 7,433,173 B2

MULTILAYER CERAMIC CAPACITOR AND METHOD FOR MANUFACTURING THE SAME

Priority is claimed to Japanese Patent Applications No. 2004-340347 filed on Nov. 25, 2004, No. 2004-371317 filed on Dec. 22, 2004, No. 2004-373173 filed on Dec. 24, 2004, No. 2004-373180 filed on Dec. 24, 2004, and No. 2004-373181 filed on Dec. 24, 2004, the disclosure of which is incorporated by reference in its entirety.

BACKGROUND OF THE INVENTION

1. Field of the Invention

The present invention relates to a multilayer ceramic capacitor and a method for manufacturing the same. Particularly, the invention relates to a small-sized multilayer ceramic capacitor of large capacity and high reliability in which a dielectric layer is composed of barium titanate crystal grains that differ from one another in at least one selected from Ca composition concentration, Sr composition concentration and Zr composition concentration, as well as a method for manufacturing the same.

2. Description of Related Art

In recent years, as mobile equipment such as cellular phones are more widely used, and as semiconductor devices that are the main components of personal computers have higher speed and higher frequency, multilayer ceramic capacitors for these electronic equipment are increasingly required to have smaller size and larger capacity.

For this reason, in a dielectric layer constituting a multilayer ceramic capacitor, attempts are made to form it in a smaller thickness and a higher number of laminations. For example, Japanese Patent Application Laid-Open No. 2003-40671 employs, as dielectric powder constituting dielectric ceramic, a mixture of barium titanate powder in which part of A site is substituted by Ca (hereinafter referred to as "BCT powder") and barium titanate power containing no substitution Ca (hereinafter referred to as "BT powder"). This improves atomicization of barium titanate crystal grains, relative dielectric constant, and DC bias characteristic in a dielectric layer after firing.

When the BCT crystal grain in the barium titanate crystal grains disclosed in Japanese Patent Application Publication Laid-Open No. 2003-40671 is fired after mixing with additives such as Mg, a rare earth element, etc. essential in controlling the temperature characteristic of relative dielectric constant, grain growth is apt to occur as Ca contained in the BCT powder is diffused, which necessitates the rigid conditional control during firing. Especially, the use of raw material whose particle diameter is not more than sub-micron may cause significant grain growth. It is therefore known that it is not easy to manufacture a sintered body composed of fine-grain barium titanate crystal grains.

For this reason, Japanese Patent Application Publication Laid-Open No. 2003-40671 further adds $MnCO_3$, MgO, and an oxide of a rare earth element, when BT powder covered with an oxide of Mg and a rare earth element is mixed with BCT powder, in order to suppress the grain growth of BCT crystal grain during firing. It is described that, by so doing, a coating layer composed of a composite oxide of high insulating property can be formed approximately uniformly on the surface of the BT crystal grain after firing, and the excess solid solution and grain growth of Mg and a rare earth element with respect to the BCT crystal grain can be suppressed.

In accordance with the manufacturing method described in the above Publication, when employed firing conditions under which there is used a small-sized experimental kiln permitting high control of firing temperatures, a sample satisfying desired relative dielectric constant, temperature characteristic and high-temperature load test characteristic can be formed even with the technique of adding $MnCO_3$, MgO, and an oxide of a rare earth element when the above-mentioned BT powder covered with an oxide of Mg and a rare earth element is mixed with the BCT powder.

On the other hand, in the management level of firing temperature with regard to such a large-sized tunnel type kiln as used for high-volume manufacturing of multilayer ceramic capacitors, there is large variations in maximum temperature during firing within the kiln. Therefore, the grain growth of BCT crystal grain is apt to cause variations during high-volume manufacturing, so that there occurs many poor in relative dielectric constant, temperature characteristic, and high-temperature load test characteristic, thereby lowering the yield.

Recently, as other high dielectric constant material for multilayer ceramic capacitor, barium titanate $(Ba_{1-x}Sr_x)TiO_3$ powder in which Ca site of the above-mentioned BCT powder is substituted by Sr (hereinafter referred to as "BST powder") has been found and used in a dielectric layer for large-capacity multilayer ceramic capacitor and a thin film capacitor (see Japanese Patent Application Publication Laid-Open No. 2004-262717 and No. 2004-281446).

As a high dielectric constant material for multilayer ceramic capacitor, $(Ba_{1-x}Ca_x)_m(Ti_{1-y}Zr_y)O_3$ (hereinafter referred to as "BCTZ") in which part of Ti site of the above-mentioned BCT powder is substituted by Zr (see Japanese Patent Application Publication Laid-Open No. 11-157928), and $(Ba_{1-x-y}Ca_xSr_y)_mTiO_3$ (hereinafter referred to as "BCST") in which part of Ba site together with Ca of the above-mentioned BCT powder is substituted by Sr (see Japanese Patent Application Publication Laid-Open No. 2002-284571), have also been found as a high dielectric constant material, and used in a dielectric layer for high-capacity type multilayer ceramic capacitor and a thin film capacitor.

However, even with such a high dielectric constant material, the same problem as described above is occurring in high-volume manufacturing.

SUMMARY OF THE INVENTION

The present invention aims at providing a multilayer ceramic capacitor that can suppress the grain growth of crystal grains when a dielectric ceramic composed of barium titanate crystal grain in which part of Ba is substituted by Ca, Sr or part of Ti is substituted by Zr is used as a dielectric layer, and that can improve relative dielectric constant, temperature characteristic, and high-temperature load test characteristic in high-volume manufacturing which uses, for example, a tunnel-type large kiln, as well as a method for manufacturing the same.

That is, a multilayer ceramic capacitor of the invention includes a capacitor body formed by alternately laminating a dielectric layer and an internal electrode layer; and an external electrode formed at both ends of the capacitor body. The dielectric layer is composed of two types of barium titanate crystal grains that differ from one another in at least one selected from Ca composition concentration, Sr composition concentration, and Zr composition concentration; and a grain boundary phase.

Specifically, a multilayer ceramic capacitor of the invention includes the following aspects:

(i) The dielectric layer is composed of at least two types of barium titanate crystal grains that differ from one another in Ca composition concentration. The barium titanate crystal grains contain Mg, a rare earth element and Mn, and also satisfy the relationship: A/B≧1.003 (in mole ratio), where A is the amount of barium or the sum of barium and Ca; and B is the amount of titanium.

(ii) The dielectric layer is composed of at least two types of crystal grains that consist may of Ba and Ti, and differ from one another in Sr composition concentration. These crystal grains contain Mg, a rare earth element and Mn, and also satisfy the relationship: A/B≧1.003 (in mole ratio), where A is the amount of Ba or the sum of Ba and Sr; and B is the amount of Ti.

(iii) The dielectric layer is composed of at least two types of crystal grains that consist mainly of Ba and Ti, and differ from one another in Ca composition concentration and Zr composition concentration. These crystal grains contain Mg, a rare earth element and Mn, and also satisfy the relationship: A/B≧1.003 (in mole ratio), where A is the amount of Ba or the sum of Ba and Ca of the dielectric layer; and B is the amount of Ti or the sum of Ti and Zr.

(iv) The dielectric layer is composed of at least two types of crystal grains that consist mainly of Ba and Ti, and differ from one another in Ca composition concentration and Sr composition concentration. These crystal grains satisfy the relationship: A/B≧1.003 (in mole ratio), where A is the sum of Ba, Ca, and Sr; and B is Ti.

(v) The dielectric layer is composed of: BCT crystal grain that consist mainly of Ba and Ti, and are not less than 0.4 atomic % in Ca composition concentration and not more than 0.2 atomic % in Zr composition concentration; and BCTZ crystal grain that is not less than 0.4 atomic % in Ca composition concentration and not less than 0.4 atomic % in Zr composition concentration. These crystal grains satisfy the relationship: A/B≧1.003 (in mole ratio), where A is the sun of Ba and Ca; and B is Ti or the sum of Ti and Zr.

This can reduce variations in grain growth between crystal grains (for example, the BCT crystal gain and the BST crystal grain), and also improve relative dielectric constant, temperature characteristic, and high-temperature load test characteristic. In high-volume manufacturing of a multilayer ceramic capacitor with use of a tunnel-type large kiln that undergoes large variations in maximum temperature during firing, the above-mentioned dielectric layer is stable in the relative dielectric constant, temperature characteristic and high-temperature load test characteristic, thereby increasing the yield.

The multilayer ceramic capacitor of the invention can be manufactured basically by firing a capacitor body forming body that is formed by alternately laminating a green sheet containing dielectric powder and organic resin, and an internal electrode pattern. Here, the dielectric powder is composed of a mixed powder of at least two types of dielectric powders that differ from one another in at least one selected from Ca composition concentration, Sr composition concentration, and Zr composition concentration. To the mixed powder, (i) an oxide of Mg, a rare earth element, and Mn; (ii) glass powder containing not more than 1 mass % of alumina; and (3) barium carbonate powder are added.

This stabilizes the relative dielectric constant and temperature characteristic of a dielectric layer whose main crystal grains are dielectric powders that differ from one another in at least one selected from Sr composition concentration and Zr composition concentration (for example, the BCT crystal grain and the BT crystal grain), when high-volume manufacturing of a multilayer ceramic capacitor is performed by a tunnel-type large kiln that undergoes large variations in maximum temperature during firing. This also stabilizes the high-temperature load test characteristic of a multilayer ceramic capacitor including this dielectric layer, thereby easily increasing the yield.

In other manufacturing method of the invention, the above-mentioned dielectric powder composed of two types of dielectric powders that differ from one another in at least one selected from Ca composition concentration, Sr composition concentration, and Zr composition concentration. The method includes: coating the dielectric powder with an oxide of Mg, a rare earth element and Mn; and then adding glass powder containing not more than 1 mass % of alumina and barium carbonate powder to the dielectric powders.

BRIEF DESCRIPTION OF THE DRAWINGS

FIG. 3(b) is a circuit diagram showing an equivalent circuit used for analyzing.

DESCRIPTION OF PREFERRED EMBODIMENTS

First Preferred Embodiment

<Structure>

Figure 1:
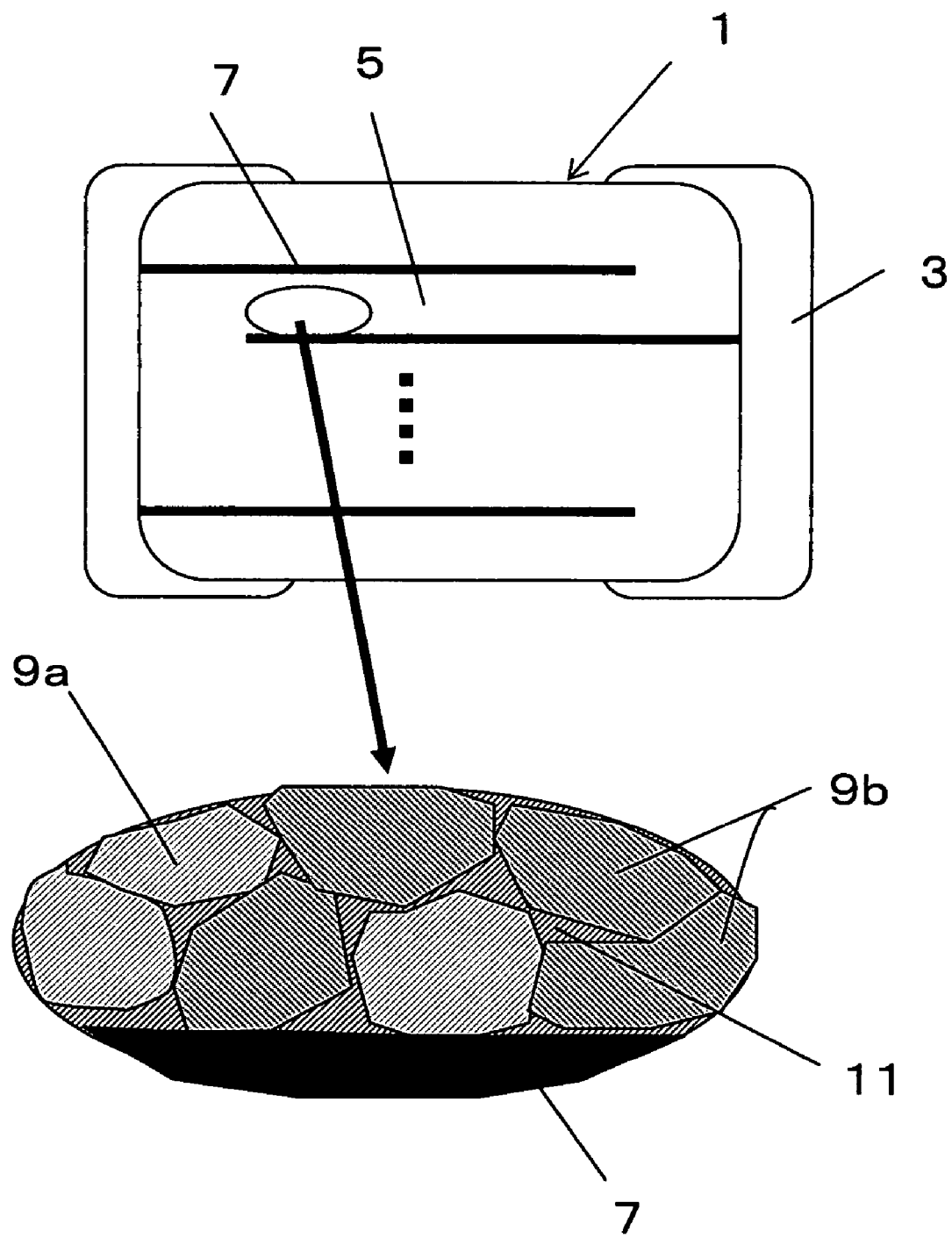
FIG. 1 is a longitudinal sectional view showing one example of a multilayer ceramic capacitor of the present invention.

A multilayer ceramic capacitor of the invention will be described in detail with reference to FIG. 1. FIG. 1 is a schematic sectional view showing a multilayer ceramic capacitor of the invention, and a partially enlarged view in FIG. 1 is a schematic diagram showing a main crystal gain and a grain boundary phase that constitute a dielectric layer. In this multilayer ceramic capacitor, an external electrode 3 is formed at both ends of a capacitor body 1, respectively. The external electrode 3 can be formed, for example by baking Cu or an alloy paste of Cu and Ni.

The capacitor body 1 is formed by alternately laminating a dielectric layer 5 and an internal electrode layer 7. The dielectric layer 5 is composed of crystal grains 9a, 9b, and a in boundary phase 11. It is preferable for miniaturization of the multilayer ceramic capacitor that the dielectric layer 5 has a thickness of not more than 3 µm, especially not more than 2.5 µm. To stabilize variations in electrostatic capacity and capacity temperature characteristic, it is further preferable that the thickness variations of the dielectric layer 5 be within 10%.

The internal electrode layer 7 is preferably composed of a base metal such as nickel (Ni) and copper (Cu), because the manufacturing cost can be suppressed if a greater number of layers arc laminated. In particular, nickel (Ni) is preferred in the interest of simultaneous firing with the dielectric layer 5 in the present invention.

The crystal grains constituting the dielectric layer 5 are preferably perovskite barium titanate crystal grains that differ from one another in Ca composition concentration. Specifically, the crystal grains are composed of a BCT crystal grain 9a (perovskite barium titanate crystal grain which part of A-site is substituted by Ca), and a BT crystal grain 9b (perovskite barium titanate crystal grain containing no substitution Ca). As above described, the coexistence of the two types of crystal grains permits excellent characteristic. The BT crystal grain 9b of the perovskite barium titanate crystal grains in the invention is a barium titanate crystal grain that is not more than 0.2 atomic % in Ca composition concentration. On the other hand, the BCT crystal grain 9a is preferably a barium titanate crystal grain that is not less than 0.4 atomic % in Ca composition concentration, and it is especially 0.5 to 2.5 atomic % in Ca composition concentration, in order to allow the BCT crystal grain 9a to maintain the function as a strong dielectric having a high relative dielectric constant.

To achieve large capacity and high insulating property by making the dielectric layer 5 in a smaller thickness, the mean particle diameter of the crystal grains 9a, 9b is not more than 0.4 µm, preferably not more than 0.7 µm in d90, wherein d90 indicates a 90% accumulated value in mass in a particle size distribution. On the other hand, the grain size lower limit of the BCT crystal grain 9a and the BT crystal grain 9b is preferably not less than 0.15 µm in order to improve the relative dielectric constant of the dielectric layer 5, and suppress the temperature dependence of relative dielectric constant.

Here, the BCT crystal grain 9a is, as described above, perovskite barium titanate in which part of A site is substituted by Ca. This can be ideally expressed by $(Ba_{1-x}Ca_x)TiO_3$. The Ca substitution amount of the A site in the BCT crystal grain 9a is x=0.01 to 0.2, preferably x=0.02 to 0.07. If the Ca substitution amount is within this range, the phase transition point in the vicinity of room temperature can sufficiently shift to a low temperature side, so that the coexistent structure with the BT crystal grain 9b can ensure excellent temperature characteristic and DC bias characteristic in a temperature range for use as a capacitor.

On the other hand, the BT crystal grain 9b is perovskite barium titanate containing no substitution Ca, which can be ideally expressed by $BaTiO_3$. In the invention, the BT crystal grain 9b is of not more than 0.2 atomic % in Ca concentration as an analysis value.

Preferably, the BCT crystal grain 9a and the BT crystal grain 9b that constitute the crystal grain 9 of the dielectric layer 5 are coexisting at a systematic rate having the following relationship: $A_{BT}/A_{BCT}=0.1$ to 3, where $A_{BCT}$ is the rate of the BCT crystal grain 9a, and $A_{BT}$ is the rate of the BT crystal grain 9b in terms of area ratio of each crystal grains in the crystal system of the cross-sectional or surface of the dielectric layer 5, in the evaluation based on the index when defining the above-mentioned Ca concentration. In particular, $A_{BT}/A_{BCT}=0.3$ to 2 is preferred in order to further improve the relative dielectric constant, temperature characteristic, and DC bias characteristic.

Both of the BCT crystal grain 9a and the BT crystal grain 9b contain Mg, a rare earth element, and Mn. The temperature characteristic of electrostatic capacity can be further stabilized and the reliability in a high-temperature load test can be improved when 0.04 to 0.14 mass parts of Mg, 0.2 to 0.9 mass parts of a rare earth element, and 0.04 to 0.15 mass parts of Mn are present to 100 mass parts of the BCT crystal gain 9a and the BT crystal grain 9b, that is, the total amount of the barium titanate crystal grains that differ one another in Ca composition concentration.

Moreover, in the interest of stabilization of the temperature characteristic of electrostatic capacity and improvement of reliability in high-temperature load test, the total concentration of Mg, a rare earth element, and Mn contained in the BCT crystal grain 9a is preferably higher than that in the BT crystal grain 9b. Since these Mg, rare earth element and Mn are derived from sintering additives, they can be in solid solution in the BCT crystal grain 9a and the BT crystal gain 9b, however, they are apt to present in part at the grain boundary phase 11, particularly as amorphous material. That is, in the dielectric layer 5, Mg and a rare earth element are components to bring the BT crystal grain 9b and the BCT crystal gain 9a into a core-shell structure. Meanwhile, Mn can compensate for oxygen defect in the BT crystal grain 9b and the BCT crystal gain 9a that can be produced by firing in the reducing atmosphere, thereby increasing insulating property and high-temperature load lifetime.

In the dielectric layer 5, it is desirable that the rare earth element contained in the crystal grains 9a and 9b has a concentration gradient of not less than 0.05 atomic %/nm from the surface to the interior of the crystal grains 9a and 9b, with the highest concentration in the grain boundary layer 11 that is the grain surface. The concentration gradient of a rare earth element satisfying this condition permits improvement in relative dielectric constant and high-temperature load lifetime, and enables capacity-temperature characteristic to meet X7R standard.

As a rare earth element, there are for example La, Ce, Pr, Nd, Sm, Gd, Tb, Dy, Ho, Y, Er, Tm, Yb, Lu, and Sc. At least one selected from these may be used.

The amount of alumina impurities contained in dielectric ceramic is preferably not more than 1 mass % in the dielectric layer 5 of the invention because the relative dielectric constant of the dielectric layer 5 can be held high, and the durability in acceleration test can be increased.

As above described, the BCT crystal grain 9a and the BT crystal grain 9b coexist in the dielectric ceramic of the invention. In this coexistence system, these crystal grains 9a and 9b form a core-shell structure in which Mg and a rare earth element derived from a sintering additive are present in a greater amount in the grain surface side than in the grain center. This leads to a high dielectric constant thereby to provide such characteristics that the temperature dependency of relative dielectric constant and DC bias dependency are extremely small.

In general, the BT crystal grain 9b exhibits a large relative dielectric constant exceeding 4000 due to fluctuation of atoms along with sequential phase transition, however, a high relative dielectric constant due to fluctuation of atoms that is prodromic phenomenon of sequential phase transition will cause a large reduction in relative dielectric constant due to application of DC bias. On the other hand, among three sequential phase transitions involved in the BT crystal grain 9b, the phase transition temperature located at the highest temperature (approximately 125° C.) remains hardly changed even if part of A site is substituted by Ca. However, the structural phase transition points in the vicinity of room temperature and at a lower temperature than that will shift to a low temperature in proportion to an increase in the amount of substitution Ca. That is, the chief factor enabling the BT crystal grain 9b to exhibit a high dielectric constant is an increase in fluctuations of atoms, which is the prodromic phenomenon of structural phase transition in the vicinity of room temperature and at a lower temperature. Therefore, in the BCT crystal gain 9a in which part of A site is substituted by Ca, the transition points in the vicinity of room temperature and at a lower temperature are shifted to a low temperature side. This decreases relative dielectric constant but significantly increases DC bias characteristic. That is, the dielectric ceramic of the invention can exhibit such characteristics that it is superior in DC bias characteristic to the BT crystal grain 9b, and it has a higher dielectric constant and has less temperature dependency of dielectric characteristic and less DC bias dependency than the BCT crystal gain 9a, by realizing the coexistence structure of the BT crystal grain 9b that is high in relative dielectric constant and excellent in temperature characteristic, and the BCT crystal grain 9a that is excellent in DC bias characteristic.

Additionally, it is important in the invention that the ratio of A mole (A site) of barium or the total of barium and Ca to B mole (B site) of titanium in barium titanate constituting the crystal grain 9 satisfies the relationship of A/B≧1.003. Furthermore, the ratio of A mole (A site) of barium or the total of barium and Ca to B mole (B site) of titanium in the BCT crystal grain 9a, which is a major component of the crystal grains 9a and 9b, is preferably not less than 1.003. It is known that when mixed with Mg and a rare earth element, the conventional BCT crystal grain is susceptible to grain growth along with the diffusion of Ca. The present invention can suppress the grain growth of the BCT crystal grain 9a by defining the A/B ratio of barium calcium titanate (the BCT crystal grain) as mentioned above.

In contrast, when the BCT crystal grain 9a contains none of Mg, a rare earth element and Mn, or the A/B ratio is not more than 1.002, the BCT crystal grain 9a is susceptible to grain growth, and insulating property is lowered, so that a defect is apt to occur under high-temperature load.

Figure 2:
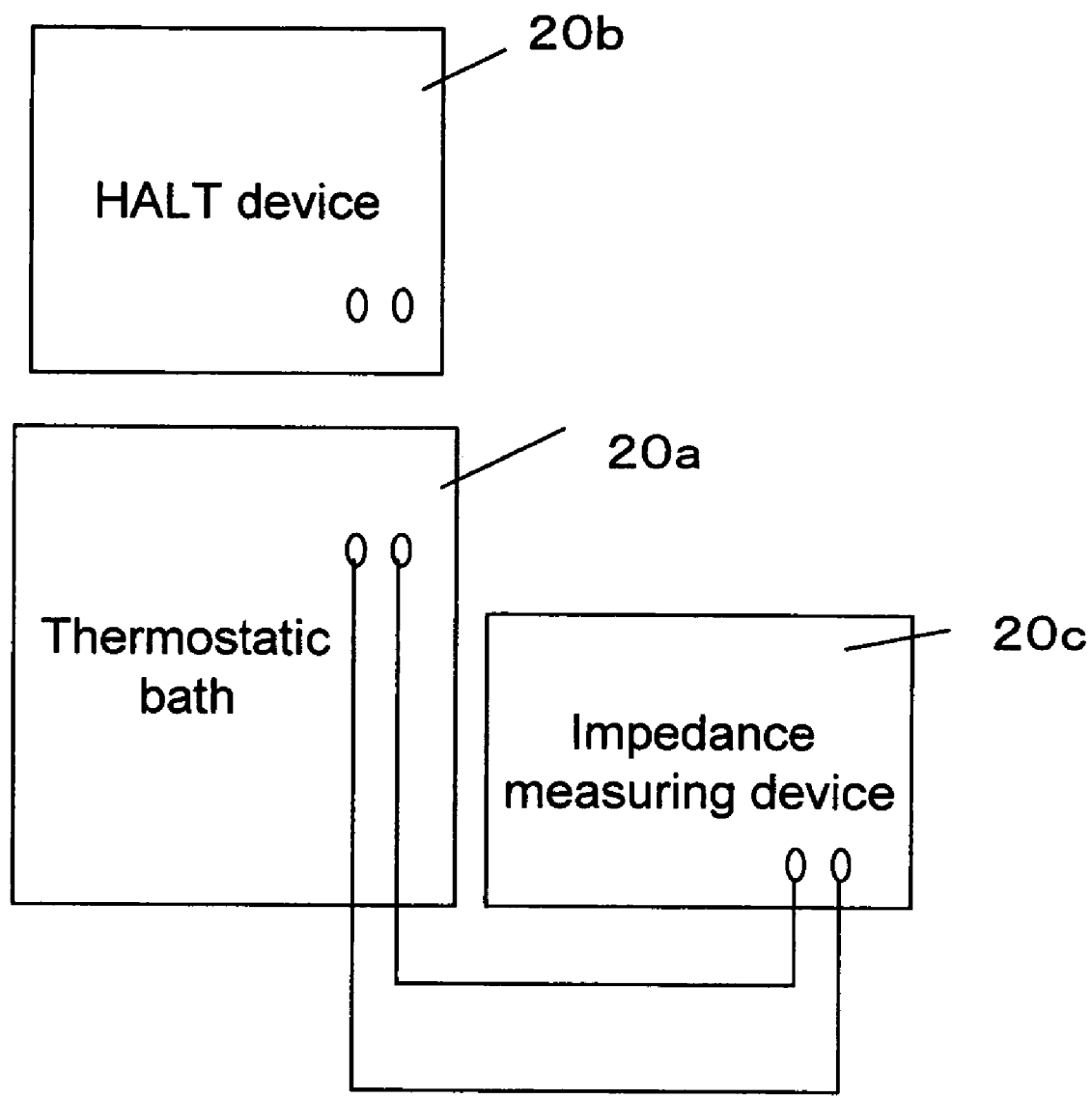
FIG. 2 is a schematic diagram showing a way to evaluate the resistance of a grain boundary in a dielectric layer, using alternating-current impedance measurement.
Figure 3A:
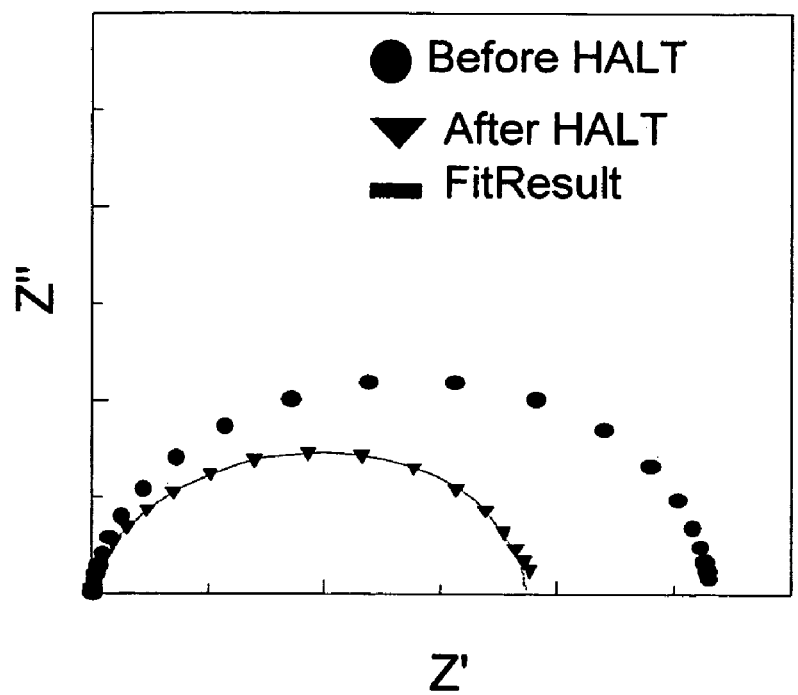
FIG. 3(a) is a graph showing a representative of evaluations results of the resistance of a grain boundary in a dielectric layer, using the alternating-current impedance measurement.
Figure 3A:
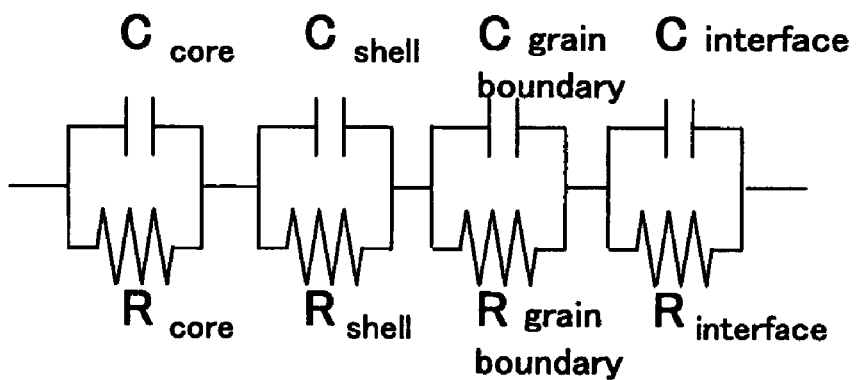

FIG. 2 is a schematic diagram showing the way to evaluate the resistance of a grain boundary in a dielectric layer, using alternating-current impedance measurement. In FIG. 2, numerical reference 20a is a thermostatic bath in which a temperature control is made by placing therein a multilayer ceramic capacitor as a sample; 20b is a HALT (Highly Accelerated Life Test) measuring device that applies a direct-current voltage to the sample; and 20c is an impedance measuring device provided with an alternating-current power supply. FIG. 3(a) is a graph showing the evaluations results of the grain boundary resistance in a dielectric layer, using the alternating-current impedance measurement. FIG. 3(b) is a circuit diagram showing an equivalent circuit for analysis.

In the present invention, a multilayer ceramic capacitor is left in a high-temperature load atmosphere such as a higher temperature than the Curie temperature exhibited by the perovskite barium titanate crystal grains constituting the dielectric layer 5, and a voltage of not less than one third the rated voltage of the multilayer ceramic capacitor. Before and after leaving the multilayer ceramic capacitor in the high-temperature load atmosphere, under the same conditions, the rate of resistance decrease of the grain boundary phase 11 in the dielectric layer 5 is determined through the alternating-current impedance measurement FIG. 3(a) is a graph (Cole-Cole's plot) showing impedance variations in a core (central portion), a shell (peripheral portion), a grain boundary phase, and the interface between the internal electrode layer 7 and the dielectric layer 5, in the crystal grains of the multilayer ceramic capacitor of the present invention. In this evaluation, as in the equivalent circuit of FIG. 3(b), the dielectric layer 5 is divided into four components: core (central portion); shell (peripheral portion); the grain boundary layer 11; and the interface between the internal electrode layer 7 and the dielectric layer 5. The abscissa of the graph indicates a real part of an impedance signal, and the ordinate indicates an imaginary part. The graph indicating impedance variations is fitting available from difference between before and after Highly Accelerated Life Test (HALT), and simulation. The present invention especially focuses on resistance variations in the grain boundary layer 11. The decrease rate of real part is desirably not more than 0.7%/min. This evaluation can be made in special software by dividing the Cole-Cole's plot before and after Highly Accelerated Life Test (HALT) in FIG. 3(a), into the above four components.

Preferably, the temperature is 1.5 times as high as the Curie temperature, and the voltage is not less than two fifth, i.e., ⅖V, the rated voltage, because before and after high-temperature load atmosphere process, ion diffusion and electron transfer in the dielectric layer 5 can be enhanced, so that the rate of resistance decrease of the grain boundary phase 11 becomes significant.

<Manufacturing Method>

Figure 4:
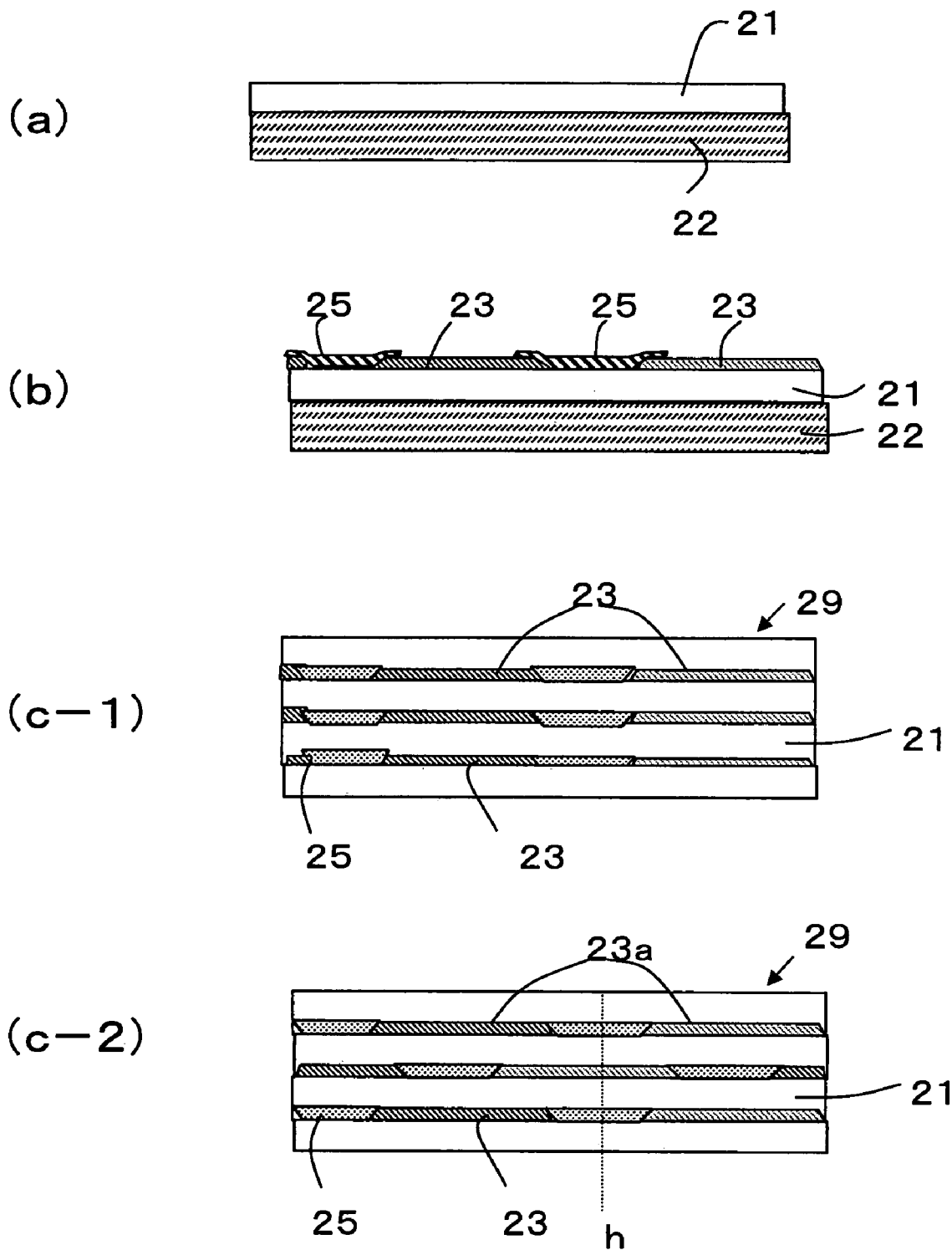
FIG. 4 is a flow chart showing an example of a method for manufacturing a multilayer ceramic capacitor.

A method for manufacturing a multilayer ceramic capacitor according to the present invention will next be described in detail. FIG. 4 is a flow chart showing the method for manufacturing a multilayer ceramic capacitor of the invention.

A multilayer ceramic capacitor of the invention can be manufactured by firing a capacitor body forming body formed by alternately laminating a green sheet that contains dielectric powder and organic resin, and an internal electrode pattern. The dielectric powder can be obtained by adding 0.5 to 1.5 mass parts, in terms of oxide, of a total of Mg, a rare earth element, and Mn, 1 to 1.4 mass parts of glass powder containing alumina in an amount of not more than 1 mass %, and 0.01 to 1 mass part of barium carbonate powder, to 100 mass parts of a mixed powder of BCT powder (perovskite barium titanate powder in which part of A site is substituted by Ca) and BT powder (perovskite barium titanate powder containing no substitution Ca).

Step (a):

First, the following raw material powder is mixed with organic resin such as polyvinyl butyral resin, and solvent such as toluene and alcohol by using a ball mill or the like, to prepare ceramic slurry. Next, the ceramic slurry is used to form a ceramic green sheet 21 on a carrier film 22 by sheet forming method such as doctor blade method or die coating method. The thickness of the ceramic green sheet 21 is preferably 1 to 4 μm, in order that a dielectric layer can be made thinner for larger capacity and a high insulating property can be maintained.

The BCT powder and the BT powder that constitute the dielectric powder used in the manufacturing method of the invention are raw material powders expressed by $(Ba_{1-x}Ca_x)TiO_3$ and $BaTiO_3$, respectively. The Ca substitution amount in the BCT powder is x=0.01 to 0.2, preferably x=0.03 to 0.1. In the BCT powder, the ratio of A mole of barium or the sum of barium and Ca to B mole of titanium, that is, A/B ratio is preferably not less than 1.003. These BT powder and BCT powder can be synthesized by mixing a compound containing Ba composition, Ca composition, and Ti composition so as to be a predetermined composition. These dielectric powders are obtainable with a synthetic method selected from solid phase method, liquid phase method (including a method of producing through oxalate), hydrothermal synthesis method, and the like. Among dielectric powders so obtained, one obtained with hydrothermal synthesis method is suitable because of narrow particle size distribution and high crystallinity.

It is desirable that the barium titanate powder (BT powder) and the barium calcium titanate powder (BCT powder), which constitute the dielectric powder of the invention, have a particle diameter of 0.15 to 0.4 μm, in order that the dielectric layer 5 can be easily made thinner and the relative dielectric constant of the dielectric powder can be increased.

When the crystallinity of dielectric powder having a high relative dielectric constant is evaluated by X-ray diffraction, the ratio of a peak of index (001) $P_{AA}$ indicating tetragonal crystal to a peak of index (100) $P_{BB}$ indicating cubic crystal, namely $P_{AA}/P_{BB}$ ratio, is preferably not less than 1.1.

In forming the dielectric layer 5 of the invention, the mixing ratio of the BCT powder to the BT powder, that is, a $W_{BCT}/W_{BT}$ ratio, where $W_{BCT}$ is the amount of the BCT powder, and $W_{BT}$ is the amount of the BT powder, is preferably in the range of 0.95 to 1.05, particularly, in order to further increase relative dielectric constant, temperature characteristic, and DC bias characteristic in the ceramic obtained after firing.

The amount of Mg added to the above-mentioned dielectric powder should be 0.04 to 0.14 mass parts in terms of oxide, to 100 mass parts of dielectric powder that is a mixture of BCT powder and BT powder. The amount of a rare earth element should be 0.2 to 0.9 mass parts in terms of oxide, to 100 mass parts of the dielectric powder. The amount of should be 0.04 to 0.15 mass parts in terms of oxide, to 100 mass parts of the dielectric powder.

The above-mentioned glass powder can be composed of, for example, $Li_2O$, $SiO_2$, BaO, and CaO. The amount of addition of the glass powder should be 0.7 to 2 mass parts to 100 mass parts of the above dielectric powder, in order to increase the degree of sintering of ceramic. Its composition is preferably as follows: 5 to 15 mol % of $Li_2O$, 40 to 60 mol % of $SiO_2$, 10 to 30 mol % of BaO, and 10 to 30 mol % of CaO. It is especially important for the glass powder of the invention to contain alumina in not more than 1 mass %, preferably not more than 0.1 mass %.

Barium carbonate powder is preferably 0.01 to 1 mass part to 100 mass parts of the mixture of BCT powder and BT powder, in order to suppress grain growth.

Step (b):

A rectangular internal electrode pattern 23 is formed, by printing, on a main surface of the ceramic green sheet 21 obtained in the step (a). Conductor paste to be an internal electrode pattern 23 can be prepared by mixing, as main composition metal, Ni or Cu or their alloy powder, and ceramic powder as a common material, and by adding organic binder, solvent, and dispersant. As metal powder, Ni is suitable because it permits simultaneous firing with the above-mentioned dielectric powder and it is low-cost. As ceramic powder, BT powder that is low in Ca concentration is suitable. Incorporating ceramic powder into conductor paste enables pillar-like ceramics to be formed in the internal electrode layer 7 of the invention, such that it passes through an electrode layer so as to connect upper and lower dielectric layers 5. This prevents peeling between the dielectric layer 5 and the internal electrode layer 7. The ceramic powder used here can suppress abnormal grain growth of pillar-like ceramics during firing, and increase mechanical strength. The capacity temperature dependency of the multilayer ceramic capacitor can also be lowered by suppressing the abnormal grain growth of the pillar-like ceramics to be formed in the internal electrode layer 7. The thickness of the internal electrode pattern 23 is preferably not more than 1 µm, in order to miniaturize the multilayer ceramic capacitor and reduce surface irregularity due to the internal electrode pattern 23.

To eliminate the surface irregularity due to the internal electrode pattern 23 on the ceramic green sheet 21, it is preferable to form, around the internal electrode pattern 23, a ceramic pattern 25 in substantially the same thickness as the internal electrode pattern 23. For the purpose of attaining the same firing shrinkage during the simultaneous firing, it is preferable to use the above-mentioned dielectric powder as ceramic component constituting the ceramic pattern 25.

Step (c):

A preliminary laminate body is formed by laminating a desired number of ceramic green sheets 21 on which the internal electrode patterns 23 are formed, and then laminating, on the upper and lower sides of the laminate so obtained, a plurality of ceramic green sheets 21 free from the internal electrode patterns 23 such that the upper and lower layers are the same in number. In the preliminary laminate body, the internal electrode patterns 23 are shifted half a pattern in the longitudinal direction. With this laminating method, the internal electrode patterns 23 can be alternately exposed on the end surfaces of after-cutting laminate body.

Instead of the above method of previously forming the internal electrode pattern 23 on a main surface of the ceramic green sheet 21, followed by laminating, the present invention can employ a method in which adhesion of the ceramic green sheet 21 and printing of the internal electrode pattern 23 are performed by turns. Specifically, this method includes the steps of temporarily having the ceramic green sheet 21 adhere to a base material on the underlayer side, followed by printing and drying the internal electrode pattern 23; and the step of overlaying a ceramic green sheet 21 free from the internal electrode pattern 23 on the printed and dried internal electrode pattern 23, followed by temporal adhesion.

Next, the preliminary laminate body is pressed under the conditions of a higher temperature and a higher pressure than the temperature and pressure in the above preliminary laminating process, thereby forming a laminate body 29 in which the ceramic green sheets 21 and the internal electrode patterns 23 are firmly adhered to each other.

The laminate body 29 is then cut along the cutting-plane line h, that is, at approximately the center of the ceramic pattern 25 formed in the laminate body 29, in the both of a vertical direction and a horizontal direction with respect to the longitudinal direction of the internal electrode pattern 23, thereby obtaining a capacitor body forming body so as to expose the end surfaces of the internal electrode pattern 23. FIG. 4 (C-1) and (C-2) are sectional views taken along the vertical and horizontal directions with respect to the longitudinal direction of the internal electrode pattern 23, respectively. On the other hand, in the widest portion of the internal electrode pattern 23, these internal electrode patterns 23 are not exposed toward a side margin portion.

This capacitor body forming body is then fired under temperature conditions in a predetermined atmosphere, thereby forming a capacitor body. In some cases, the edge portions of the capacitor body may be chamfered, and barrel polishing may be performed to expose the internal electrode layers that are exposed from the opposing end surfaces in the capacitor body. The following conditions am suitable for this manufacturing method. That is, debinding is performed in a temperature range of up to 500° C.; a temperature raising rate is 5 to 20° C./h; the maximum temperature of firing is from 1130 to 1230° C.; the temperature raising rate for a debinding to the maximum temperature is 200 to 500° C./h; the holding time at the maximum temperature is 0.5 to 4 hours; the temperature lowering rate from the maximum temperature to 1000° C. is 200 to 500° C./h in hydrogen-nitrogen atmosphere; and the maximum temperature of heat treatment (reoxidation treatment) after fixing is 900 to 1100° C. in nitrogen atmosphere.

Subsequently, to the opposing ends of the capacitor body 1, external electrode paste is applied and baked thereby forming an external electrode 3. In addition, a plating film for increasing packaging is then formed on the surface of the external electrode 3.

Instead of adding oxide powder of Mg, a rare earth element, and Mn to the BCT powder and the BT powder, as above described, the present invention can employ dielectric powder such as BCT powder and BT powder that are coated with oxide powder of Mg, a rare earth element, and Mn. In this case, the step (a) to step (c) in FIG. 4 are the same except that dielectric powder differ from one another.

Specifically, in the method for manufacturing a multilayer ceramic capacitor of the invention, the dielectric powder is composed of BCT powder coated with oxide power of Mg, a rare earth element, and Mn, and BT powder. To 100 mass part of a mixed powder of the BCT powder and the BT powder, 1 to 1.4 mass part of glass powder containing not more than 1 mass % of alumina, and 0.01 to 1 mass part of barium carbonate powder are added.

This requires less oxide of Mg, a rare earth element, and Mn, and especially reduces the amount of Mg and a rare earth element, as compared with the above-mentioned case where an oxide of Mg, a rare earth element and Mn is added. This suppresses a drop in relative dielectric constant of the BT power and the BCT powder, making it possible to use finer BT powder and finer BCT powder.

Coating an oxide of Mg, a rare earth element, and Mn onto BT powder and BCT powder is attainable by incorporating a predetermined amount of an oxide of Mg, a are earth element and Mn, into the BT powder and the CT powder, and by performing a mechanochemical method.

Since the BCT powder and the BT powder can be individually coated with Mg, a rare earth element, and Mn, their respective coating amounts can be changed. The total concentration of Mn, a rare earth element, and Mn that are contained in the BCT powder is preferably higher than that in the BT powder. This permits effective suppression of the grain growth of the BCT powder susceptible to grain growth during firing. This also suppresses Ca from diffusing from the BCT powder.

In general, the BCT crystal grain $9a$ and the BT crystal grain $9b$ are apt to cause grain growth due to atomic diffusion during firing, thus making it difficult to obtain a dense sintered body with a small particle diameter. Especially, when using a raw material having a particle diameter smaller than sub-micron, the rate of the surface area to the particle volume is large. A large surface energy results in energetically unstable state. For this reason, atomic diffusion causes grain growth during firing, so that the surface area decreases and surface energy is lowered, thereby allowing for stabilization. As a result, the grain growth is apt to occur, making it difficult to obtain a dense sintered body composed of micro particles.

Specifically, a sintered body of a BT crystal grain $9b$ and a BCT crystal grain $9a$ that have a micro particle diameter smaller than 0.2 μm easily cause solid solution and grain grows. If something to suppress the movement of atoms between particles is absent between the particles, a sintered body having a large particle diameter exceeding 1 μm will be formed. It is therefore difficult to obtain a sintered body having a micro particle diameter of not more than submicron level. Hence, the present invention provides a sintered body composed of micro particles reflecting a crystal particle diameter of raw materials, by setting an A/B ratio in mole at not less than 1.003, where A is an amount of barium or the sum of barium and Ca; and B is an amount of titanium in barium calcium titanate crystal (BCT crystal grain $9a$), by incorporating Mg and a rare earth element such as Y, as an addition agent, as well as the raw material of micro crystals, and by adjusting firing conditions. Higher element ratio on A site in barium titanate or barium calcium titanate allows more barium or barium calcium to exist on the particles surfaces, so that barium and other additive agents diffuse on the particles surfaces and form a liquid phase thereby to facilitate sintering. They are also present in the vicinity of a grain boundary and the grain boundary thereby to suppress the movement of atoms of Ba, Ca, and Ti between the BT and BCT crystal grains as a parent phase and also suppress grain growth. As a result formed on the surfaces of crystal grains is a crystal phase in which, besides barium, Mg and a rare earth element are diffused and are in solid solution on the surface of the crystal grain 9. In other words, a core-shell structure is formed in which Mg and a rare earth element are present in a greater amount on the particles surfaces. The formation of the core-shell structure can be confirmed by observing these crystal grains with a transmission electron microscope.

Second Preferred Embodiment

A second preferred embodiment of the invention will next be described. Although the description overlapping with that of the first preferred embodiment has left out of the following, the second preferred embodiment is the same as the first preferred embodiment, except that the foregoing BCT crystal grain is replaced with BST crystal grain (namely, perovskite barium titanate crystal grain in which part of A site is substituted by Sr). Therefore, in the following, reference is made to the same drawing as the first preferred embodiment, particularly FIG. 1 and FIG. 4, and the some reference numeral "$9a$" has been retained for the BST crystal grain.

Crystal grains $9a$ and $9b$ constituting a dielectric layer 5 of the second preferred embodiment are crystal grains that consist mainly of Ba and Ti, and differ from one another in Sr composition concentration. Specifically, these crystal grains are a perovskite barium titanate crystal grain (BST crystal grain) in which part of A site is substituted by Sr, and a perovskite barium titanate crystal grain (BT crystal grain) containing no substitution Sr.

In other words, the crystal grains $9a$ and $9b$ contain the BST crystal grain $9a$ and the BT crystal grain $9b$, so that the coexistence of the two types of crystal grains permits excellent characteristic, as described above. Ideally, the BT crystal grain $9b$ can be expressed by $BaTiO_3$. Although the BT crystal grain $9b$ containing no Sr is one whose Sr concentration is not more than 0.2 atomic % as an analytic value, it includes a portion of the Sr composition contained in the BST crystal grain $9a$ which is being slightly diffused into the BT crystal grain $9b$.

On the other hand, the BST crystal grain $9a$ is preferably not less than 0.4 atomic % in Sr composition concentration, especially, 0.5 to 2.5 atomic %, in order to allow the BST crystal grain $9a$ to maintain the function as a strong dielectric having a high relative dielectric constant.

Here, the BST crystal grain $9a$ is, as described above, the perovskite barium titanate crystal grain in which part of A site is substituted by Sr. This can be ideally expressed by $(Ba_{1-x}Sr_x)TiO_3$. The Sr substitution amount of in A site in the BST crystal grain $9a$ is x=0.01 to 0.2, preferably x=0.02 to 0.07. If the Sr substitution amount is within this range, the phase transition point in the vicinity of room temperature can sufficiently shift to a low temperature side, so that the coexistent spectrum with the BT crystal grain $9b$ can ensure excellent temper characteristic and DC bias characteristic in a temperature range for use as a capacitor.

Preferably, the BST crystal grain $9a$ and the BT crystal grain $9b$ are coexisting at a systemic rate having the following relationship: $A_{BT}/A_{BST}$=0.1 to 3, where $A_{BST}$ is the rate of the BST crystal grain $9a$, and $A_{BT}$ is the rate of the BT crystal grain $9b$ in terms of area ratio of each crystal grain in the crystal system of the cross-sectional or surface of the dielectric layer 5, in the evaluation based on the index when defining the above-mentioned Sr concentration. In particular, $A_{BT}/A_{BST}=0.3$ to 2 is preferred in order to further improve relative dielectric constant, temperature characteristic, and DC bias characteristic.

The barium titanate crystal grains 9a and 9b of the second preferred embodiment have the same characteristic expression mechanism as the first preferred embodiment.

<Manufacturing Method>

In the same manner as in the first preferred embodiment, a multilayer ceramic capacitor of the second preferred embodiment can be manufactured by firing a capacitor body forming body configured by alternatively laminating a green sheet that contains dielectric powder and organic resin, and an internal electrode pattern. The dielectric powder can be obtained by adding an oxide of Mg, a rare earth element and Mn, glass powder containing alumina in an amount of not more than 1 mass %, and barium carbonate powder, to a mixed powder of perovskite barium titanate powder in which part of A site is substituted by Sr (BST powder) and perovskite barium titanate powder containing no substitution Sr (BT powder).

High dielectric constant and high insulating property can be attained and temperature characteristic of dielectric constant and high-temperature load lifetime can be improved when the above dielectric power incorporates: (i) 0.05 to 1.5 mass parts, in terms of oxide, of the total of Mg, a rare earth element and Mn, (ii) 0.5 to 1.4 mass parts of glass powder containing not more than 1 mass % of alumina, and (iii) 0.01 to 1 mass part of barium carbonate powder, to 100 mass parts of a mixture of the BST powder and the BT powder.

The BST powder in which part of Ba site is substituted by Sr, and the BT powder containing no Sr, which constitute the dielectric powder, are raw material powders expressed by $(Ba_{1-x}Sr_x)TiO_3$ and $BaTiO_3$, respectively. The Sr substitution amount within A site in the BST powder is preferably $x=0.01$ to 0.2, especially $x=0.03$ to 0.1. The atomic ratio of A site (barium) to B site (titanium), which are components of the BT powder, namely A/B ratio, is preferably not less than 1.003. These BT powder and BST powder can be synthesized by mixing a compound containing Ba composition, Sr composition, and Ti composition so as to be a predetermined composition. These dielectric powders are obtainable with a synthetic method selected from solid phase method, liquid phase method (including a method of producing through oxalate), hydrothermal synthesis method, and the like. Among dielectric powders so obtained, one obtained with hydrothermal synthesis method is suitable because of narrow particle size distribution and high crystallinity.

It is desirable that the barium titanate powder (BT powder) and the barium titanate strontium powder (BST powder) constituting the dielectric powder have a particle diameter of 0.15 to 0.4 μm, in order that the dielectric layer 5 can be easily made thinner and the relative dielectric constant of the dielectric powder can be increased.

The amount of Mg added to the above-mentioned dielectric powder should be 0.04 to 0.14 mass parts in terms of oxide, to 100 mass parts of dielectric powder that is a mixture of the BST powder and the BT powder. The amount of a rare earth element should be 0.2 to 0.9 mass parts in terms of oxide, to 100 mass parts of the above dielectric powder. The amount of Mn should be 0.04 to 0.15 mass parts in terms of oxide, to 100 mass parts of the above dielectric powder.

The glass powder added to the above-mentioned dielectric powder can be composed of, for example, $Li_2O$, $SiO_2$, $BaO$, and $CaO$. The amount of the glass powder should be 0.5 to 1.4 mass parts to 100 mass part of the above dielectric powder, in order to increase the degree of sintering of ceramic. Its composition is preferably as follows: 5 to 15 mol % of $Li_2O$, 40 to 60 mol % of $SiO_2$, 10 to 30 mol % of BaO, and 10 to 30 mol % of CaO. It is especially important for the glass powder of the invention to contain alumina in not more than 1 mass %, preferably not more than 0.1 mass %. When the content of alumina is greater than 1 mass %, the crystal grains cause grain growth, and the temperature characteristic of relative dielectric constant increases, so that high-temperature load lifetime is lowered. Barium carbonate powder is preferably 0.01 to 1 mass part to 100 mass parts of the dielectric powder that is a mixture of the BST powder and the BT powder, in order to suppress grain growth.

Third Preferred Embodiment

A third preferred embodiment of the invention will next be described. Although the description overlapping with that of the first preferred embodiment has left out of the following, the third preferred embodiment is the same as the first preferred embodiment, except that the foregoing BCT crystal grain 9a is replaced with a BCTZ crystal grain. Therefore, in the following, reference is made to the same drawing as the first preferred embodiment, and the same reference numeral "9a" has been retained for the BCTZ crystal grain.

Crystal grains 9a and 9b constituting a dielectric layer 5 are crystal grains that consist mainly of Ba and Ti, and differ from one another in Ca composition concentration and Zr composition concentration, specifically perovskite barium titanate crystal grain (BCTZ crystal grain 9a) in which part of A site is substituted by Ca and part of B site is substituted by Zr, and perovskite barium titanate crystal grain (BT crystal grain 9b) containing neither Ca nor Zr.

In other words, the crystal grains 9a and 9b comprises the BCTZ crystal grain 9a and the BT crystal grain 9b, so that the coexistence of the two types of crystal grains permits excellent characteristic, as described above. Ideally, the BT crystal grain 9b can be expressed by $BaTiO_3$. Although the BT crystal grain 9b containing neither Ca nor Zr is one whose Ca and Zr concentrations are each not more than 0.2 atomic % as an analytic value, it includes a portion of the Ca and Zr compositions contained in the BCTZ crystal grain 9a which is being slightly diffused into the BT crystal grain 9b.

On the other hand, the BCTZ crystal grain 9a is preferably not less than 0.4 atomic % in Ca composition concentration, especially 0.5 to 2.5 atomic %, in order to allow the BCTZ 9a to maintain the function as a strong dielectric having a high relative dielectric constant.

Here, the BCTZ crystal grain 9a is, as described above, the perovskite barium titanate crystal grain in which part of A site is substituted by Ca, and part of B site is substituted by Zr. This can be ideally expressed by $(Ba_{1-x}Ca_x)_m(Ti_{1-y}Zr_y)O_3$. The Ca substitution amount within the A site in the BCTZ crystal grain 9a is preferably $x=0.01$ to 0.2, especially $x=0.02$ to 0.07, and $y=0.15$ to 0.25, especially $y=0.175$ to 0.225. If the Ca substitution amount is within this range, the phase transition point in the vicinity of room temperature can sufficiently shift to a low temperature side, so that the coexistent structure with the BT crystal grain 9b can ensure excellent temperature characteristic and DC bias characteristic in a temperature range for use as a capacitor. If the Zr substitution amount is within the above range, there are the effects of reducing dielectric loss and increasing relative dielectric constant.

Preferably, the BCTZ crystal grain 9a and the BT crystal grain 9b that constitute the crystal grains 9a and 9b of the dielectric layer 5 are coexisting at a systematic rate having the following relationship: $A_{BT}/A_{BCTZ}=0.1$ to 3, where $A_{BCTZ}$ is the rate of the BCTZ crystal grain 9a, and $A_{BT}$ is the rate of the BT crystal 9b in terms of area ratio of each crystal grain in the crystal system of the cross-sectional or surface of the dielectric layer 5, in the evaluation based on the index when defining the above-mentioned Ca concentration. In particular, $A_{BT}/A_{BCTZ}=0.3$ to 2 is preferred in order to further improve relative dielectric constant, temperature characteristic, and DC bias characteristic.

Both of the BCTZ crystal grain 9a and the BT crystal grain 9b contain Mg, a rare earth element, and Mn. The temperature characteristic of electrostatic capacity can be further stabilized and the reliability in high-temperature load test characteristic can be improved when the content of Mg is 0.04 to 0.14 mass parts, especially 0.04 to 0.1 mass parts in terms of MgO; the content of a rare earth element is 0.2 to 0.9 mass parts, especially 0.22 to 0.5 mass parts in terms of $Re_2O_3$; and the content of Mn is 0.04 to 0.15 mass parts, especially 0.05 to 0.1 mass part in terms of $MnCO_3$ (in the case of coating, it is in the form of MnO).

As above described, the BCTZ crystal grain 9a and the BT crystal grain 9b coexist in the dielectric ceramic of the invention. In this coexistence system, these crystal grains 9a and 9b form a core-shell structure in which Mg and a rare earth element derived from a sintering additive are present in a greater amount in the grain surface than in the grain center. This leads to a high dielectric constant thereby to provide such characteristics that the temperature dependency of relative dielectric constant and DC bias dependency are extremely small.

The following is the characteristic expression mechanism of the main crystal grain 9 comprising mainly barium titanate according to the present invention. In general, the BT crystal grain 9b exhibits a large relative dielectric constant exceeding 4000 due to fluctuation of atoms along with sequential phase transition, however, a high relative dielectric constant due to fluctuation of atoms that is prodromic phenomenon of sequential phase transition will cause a large reduction in relative dielectric constant due to application of DC bias. Among three sequential phase transitions involved in the BT crystal grain 9b, the phase transition temperature located at the highest temperature (approximately 125° C.) remains hardly changed even if part of A site is substituted by Ca. However, the structural phase transition points in the vicinity of room temperature and at a lower temperature than that will shift to a low temperature in proportion to an increase in the amount of substitution Ca. That is, the chief factor enabling the BT crystal grain 9b to exhibit a high dielectric constant is an increase in fluctuations of atoms, which is the prodromic phenomenon of structural phase transition in the vicinity of room temperature and at a lower temperature.

On the other hand, in the BCTZ crystal grain 9a, Ca functions as depressor that flattens the temperature characteristic of relative dielectric constant and also functions as an element to increase insulation resistance value, and Zr functions as a shifter to mainly shift Curie point to a low temperature side. Hence, the transfer points in the vicinity of room temperature and at a lower temperature are shifted to a low temperature side, thereby enabling the relative dielectric constant in the vicinity of room temperature to be extremely improved.

In other words, the dielectric ceramic of the invention attains a higher relative dielectric constant than the BT crystal 9b and less temperature dependency of dielectric characteristic than the BCTZ crystal grain 9a, by realizing the coexistence structure of the BT crystal grain 9b excellent in temperature characteristic and the BCTZ crystal grain 9a having an extremely high relative dielectric constant in the vicinity of room temperature.

Additionally, in the dielectric ceramic of the invention the main crystal grain 9 is composed of crystal grains that consist mainly of Ba and Ti, and differ from one another in Ca and Zr compositions concentrations, and it contains Mg, a rare earth element, and Mn. It is also important to satisfy the relationship of $A/B \geqq 1.003$, where A mole is an amount of Ba or the sum of Ba and Ca; and B is an amount of Ti or the sum of Ti and Zr. Furthermore, the mole ratio of A site (Ba, Ca) to B site (Ti, Zr) in the BCTZ crystal grain 9a, as a major component of the crystal grains constituting the main crystal grain 9, namely A/B ratio, is preferably not less than 1.003. In the conventional BCTZ crystal grain, if mixed with Mg and a rare earth element, grain growth is apt to occur along with the diffusion of Ca. On the other hand, the present invention can suppress particularly the grain growth of the BCTZ crystal grain 9a by defining the A/B ratio of the BCTZ crystal grain 9a as mentioned above.

In contrast, when the BCTZ crystal grain 9a contains none of Mg, a rare earth element and Mn, or when the A/B ratio is not more than 1.002, the BCTZ crystal grain 9a is susceptible to growth, and insulation property is lowered, so that a defect is apt to occur in high-temperature load test.

<Manufacturing Method>

In the same manner as in the first preferred embodiment, a multilayer ceramic capacitor of the third preferred embodiment can be manufactured by firing a capacitor body forming body configured by alternately laminating a green sheet that contains dielectric powder and organic resin, and an internal electrode pattern.

Preferably, the dielectric powder can be obtained by adding (i) 0.05 to 1.5 mass parts, in terms of oxide, of the total of Mg, a rare earth element, and Mn, (ii) 1 to 1.4 mass parts of glass powder containing not more than 1 mass % of alumina, and (iii) 0.01 to 1 mass part of barium carbonate powder to 100 mass parts of a mixture of perovskite barium titanate powder in which part of A site is substituted by Ca, and part of B site is substituted by Zr (BCTZ powder) and perovskite barium titanate powder containing neither Ca nor Zr (BT powder).

The BCTZ powder and the BT powder that constitute the dielectric powder are raw material powders expressed by $(Ba_{1-x}Ca_x)_m(Ti_{1-y}Zr_y)O_3$ and $BaTiO_3$, respectively, The Ca substitution amount in A site in the BCTZ powder is preferably x=0.01 to 0.2, especially x=0.02 to 0.07, and y=0.15 to 0.25, especially y=0.175 to 0.225. The atomic ratio of A site (Ba, Ca) to B site (Ti, Zr), which are components of the BCTZ powder, namely A/B ratio, is preferably not less than 1.003. These BT powder and BCTZ powder can be synthesized by mixing a compound containing Ba composition, Ca composition, Ti composition, and Zr composition so as to be a predetermined composition. These dielectric powders are obtainable with a synthetic method selected from solid phase method, liquid phase method (including a method of producing through oxalate), hydrothermal synthesis method, and the like. Among dielectric powders so obtained, one obtained with hydrothermal synthesis method is suitable because of narrow particle size distribution and high crystallinity.

In this case, the amounts of Mg, a rare earth element, and Mn added to the above-mentioned dielectric powder should be, in terms of oxide, 0.04 to 0.14 mass parts, 0.2 to 0.9 mass parts, and 0.04 to 0.15 mass parts respectively, to 100 mass parts of a mixed powder of the BCTZ powder and the BT powder.

The glass powder added to the above-mentioned dielectric powder can be composed of, for example, $Li_2O$, $SiO_2$, BaO, and CaO. The amount of the glass powder should be 1 to 1.3 mass parts to 100 mass parts of the dielectric powder that is a mixture of the BCTZ powder and the BT powder, in order to increase the degree of sintering of ceramic. Its composition is preferably as follows: 5 to 15 mol % of $Li_2O$, 40 to 60 mol % of $SiO_2$, 10 to 30 mol % of BaO, and 10 to 30 mol % of CaO. It is especially important for the glass powder of the invention to contain alumina in not more than 1 mass %, preferably not more than 0.1 mass %. The mean particle diameter is preferably not more than 0.5 μm, for the reason that the dispersibility of glass powder can be increased and the area of the grain boundary phase 11 can be narrowed.

Barium carbonate powder is preferably 0.01 to 1 mass part to 100 mass parts of the dielectric powder that is a mixture of the BCTZ powder and the BT powder, in order to suppress grain growth.

A capacitor body forming body is fired under temperature conditions in a predetermined atmosphere, thereby forming a capacitor body. In some cases, the edge portions of the capacitor body may be chamfered, and barrel polishing may be performed to expose the internal electrode layers that are exposed from the opposing end surfaces in the capacitor body. The following conditions are suitable for this manufacturing method. That is, debinding is performed in a temperature range of up to 500° C.; a temperature raising rate is 5 to 20° C./h; the maximum temperature of firing is from 1130 to 1250° C.; the temperature rising rate from debinding to the maximum temperature is 200 to 500° C./h; the holding time at the maximum temperature is 0.5 to 4 hours; the temperature lowering rate from the maximum temperature to 1000° C. is 200 to 500° C./h; the atmosphere (oxygen partial pressure $PO_2$) is $10^{-7}$ to $10^{-5}$ Pa; and the maximum temperature of heat treatment (reoxidation treatment) after firing is 900 to 1100° C. in nitrogen atmosphere.

In other method for manufacturing a multilayer ceramic capacitor, each of the above-mentioned dielectric powders is coated with an oxide of Mg, a rare earth element, and Mn, and 1 to 1.4 mass part of glass powder containing not more than 1 mass % of alumina, and 0.01 to 1 mass part of barium carbonate powder are added to 100 mass parts of a mixed powder of perovskite barium titanate powder in which part of A site is substituted by Ca, and part of B site is substituted by Zr (BCTZ powder), and perovskite barium titanate powder containing no substitution Ca (BT powder). Otherwise, the method is identical to that described above.

Fourth Preferred Embodiment

A fourth preferred embodiment of the invention will next be described. Although the description overlapping with that of the first preferred embodiment has left out of the following, the fourth preferred embodiment is the same as the first preferred embodiment, except that the foregoing BCT crystal grain is replaced with BCST crystal grain and that foregoing BT crystal grain is replaced with BCT crystal grain. Therefore, in the following, reference is made to the same drawing as the first preferred embodiment, particularly FIG. 1 and FIG. 4. The same reference numeral "9a" as the BCT crystal grain has been retained for the BCST crystal grain, and the same reference numeral "9b" as BT crystal grain has been retained for the BCT crystal grain.

The capacitor body 1 shown in FIG. 1 is configured by alternately laminating a dielectric layer 5 and an internal electrode layer 7. The dielectric layer 5 is composed of crystal grains 9a and 9b, and a grain boundary phase 11. Its thickness is preferably not more than 3 μm, especially not more than 2 μm, in order to achieve a small high-capacity multilayer ceramic capacitor.

To achieve high capacity and high insulating property by making the dielectric layer 5 in a smaller thickness, the mean particle diameter of the BCST crystal grain 9a and the BCT crystal grain 9b is each not more than 0.5 μm, or not more than 0.7 μm in d90, where d90 indicates a 90% accumulated value in mass in a particle size distribution. On the other hand, the grain size lower limit of these crystal grains 9a and 9b is preferably not less than 0.05 μm in order to improve the relative dielectric constant of the dielectric layer 5, and suppress the temperature dependence of relative dielectric constant.

These crystal grains 9a and 9b are perovskite barium titanate crystal grains that differ from one another in Ca composition concentration and Sr composition concentration. Specifically, the crystal grains are composed of a perovskite barium titanate crystal grain in which part of A site is substituted by Ca and Sr (BCST crystal grain), and a perovskite barium titanate crystal grain in which part of A site is substituted by Ca, and which contains no substitution Sr (BCT crystal grain). That is, the crystal grain 9a and 9b contain the BCST crystal grain 9a and the BCT crystal grain 9b. As above described, the coexistence of the two types of crystal grains permits excellent property.

The BCT crystal grain 9b is, as described above, the perovskite barium titanate crystal grain which part of A site is substituted by Ca. This can be ideally expressed by the equation: $(Ba_{1-x}Ca_x)TiO_3$. The Ca substitution amount in A site in the BCT crystal grain 9b is preferably x=0.005 to 0.15, especially x=0.01 to 0.1. Normally, Mg and a rare earth element are in solid solution in B site (in A site in some cases). If the Ca substitution amount is within this range, the phase transition point in the vicinity of room temperature can sufficiently shift to a low temperature side, so that the coexistent structure with the BCST crystal grain 9a can ensure flat temperature dependency and excellent DC bias characteristic in a temperature range for use as a capacitor. The BCT crystal grain 9b is barium titanate crystal grain having therein not less than 0.4 atomic % of Ca composition concentration, and not more 0.2 atomic % of Sr composition concentration.

On the other hand, the BCST crystal grain 9a is, as described above, the perovskite barium titanate crystal grain in which part of A site is substituted by Ca and Sr. This can be ideally expressed by the following equation: $(Ba_{1-x-y}Ca_xSr_y)TiO_3$. As in the case with the BCT crystal grain 9b, Mg and a rare earth element are normally in solid solution in B site.

In the present invention, the Ca substitution amount in A site in the BCST crystal grain 9a is preferably x=0.005 to 0.1, especially x=0.01 to 0.05, and the Sr substitution amount is preferably y=0.005 to 0.1, especially x=0.05 to 0.1. If the Ca substitution amount and the Sr substitution amount in A site in the BCST crystal grain 9a are within this range, the BCST crystal grain 9a can have a relative dielectric constant peak in the vicinity of 100° C. a, and exhibit a large relative dielectric constant. Preferably, the BCST crystal grain 9a is barium titanate crystal grain having not less than 0.4 atomic % of Ca composition concentration and not less than 0.4 atomic % of Sr composition concentration, and it especially has 0.5 to 10 atomic % of Ca composition concentration and 0.5 to 10 atomic % of Sr composition concentration, in order to allow the BCST crystal grain 9a to maintain the function as a strong dielectric having a high relative dielectric constant.

Preferably, the BCST crystal grain 9a and the BCT crystal grain 9b that constitutes the main crystal grain 9 of the dielectric layer 5 are coexisting at a systematic rate having the following relationship: $A_{BCT}/A_{BCTZ}$=0.05 to 20, especially 0.25 to 4, where $A_{BCST}$ is the rate of the BCST crystal grain 9a, and $A_{BCT}$ is the rate of the BCT crystal grain 9b in terms of area ratio of each crystal grain in the crystal system of the cross-sectional or surface of the dielectric layer 5, in the evaluation based on the index when defining the above-mentioned Ca concentration. In particular, $A_{BCT}/A_{BCST}=0.25$ to 4 is preferred in order to further improve the relative dielectric constant, temperature characteristic, and DC bias characteristic.

Preferably, both of the BCST crystal grain 9a and the BCT crystal grain 9b contain Mg, a rare earth element, and Mn. The temperature characteristic of electrostatic capacity can be further stabilized and the reliability in a high-temperature load test characteristic can be improved when, to 100 mass parts of the main crystal grain, 0.2 to 0.6 mass parts of Mg, 0.5 to 0.9 mass parts of a rare earth element, and 0.1 to 0.4 mass parts of Mn are present in the crystal grains 9a and 9b.

Since these Mg, rare earth element and Mn are derived from sintering additives, they can be in solid solution in the BCST crystal grain 9a and the BCT crystal grain 9b, thereby increasing the degree of sintering, however, they are present in part at the grain boundary phase 11. That is, in the dielectric layer 5, Mg and a rare earth element are components to bring the BCT crystal grain 9b and the BCST crystal grain 9a into a core-shell structure. Meanwhile, Mn can compensate for oxygen defect in the BCT crystal grain 9b and the BC crystal 9a, which can be produced by firing in the reducing atmosphere, thereby increasing insulating property and high-temperature load lifetime.

As above described the BCST crystal grain 9a and the BCT crystal grain 9b coexist in the dielectric ceramic of the invention. In this coexistence system, these crystal grains 9a and 9b form a core-shell structure in which Mg and a rare earth element derived from a sintering additive are present in a greater amount in the grain surface side than in the grain center. This leads to a high dielectric constant thereby to provide such characteristics that the temperature dependency of relative dielectric constant and DC bias dependency are extremely small.

Here, the expression of characteristic of the BCT crystal grain 9b will be described in detail. Among three sequential phase transitions involved in the BT ($BaTiO_3$) crystal grain, the phase transition temperature located at the highest temperature (approximately 125° C.) remains hardly changed even if part of A site is substituted by Ca. However, the structural phase transition points in the vicinity of room temperature and at a lower temperature than that will shift to a low temperature in proportion to an increase in the amount of substitution Ca. That is, the chief factor enabling the BT crystal grain 9b to exhibit a high dielectric constant is an increase in fluctuations of atoms, which is the prodromic phenomenon of structural phase transition in the vicinity of room temperature and at a lower temperature. Hence, in the BCT crystal grain 9b in which part of A site is substituted by Ca, the transition points in the vicinity of room temperature and at a lower temperature are shifted to a low temperature site, so that relative dielectric constant decreases, but DC bias characteristic improves considerably.

When part of Ba is substituted by Sr that has a smaller radius than Ba, but can stably enter Ba site of the BT crystal grain, paraelectricity-ferroelectricity transition temperature in the vicinity of 125° C. is lowered. It is known that $(Ba,Sr)TiO_3$ in which part of Ba is substituted by Sr has a large relative dielectric constant peak in the vicinity of room temperature, and Sr substitution enables the relative dielectric constant peak to be obtained at a temperature lower than 125° C. When part of Ba in the BCT crystal grain 9b is substitute by Sr, the effect of Ca and the effect of Sr coexist, thereby exhibiting excellent reduction resistance. Sr substitution can increase the sintering temperature of the BCT crystal grain 9b.

Accordingly, when firing BCST powder and BCT powder that are mixed powder, because both powders contain Ca composition, Ca diffusion can be suppressed. At the same time, the excellent reliability of both of the BSCT crystal grain 9a and the BCT crystal grain 9b, and the high dielectric constant of the BSCT crystal grain 9a contribute to high relative dielectric constant and characteristic excellent in insulation reliability.

It is more preferable that the BCT crystal grain 9b and the BCST crystal grain 9a are coexisting in a mean particle diameter of submicron order (0.05 to 0.5 μm) as described above. However, miniaturization of crystal grain size is effective in making the dielectric layer 5 in a smaller thickness, but when the BCT crystal grain 9b is used alone, it is difficult for the particle diameter of submicron order to form a core-shell particle structure effective in temperature characteristic and DC bias characteristic (in which Mg and a rare earth element are present in a greater amount in the particle surfaces).

Specifically, when the BCT crystal grain 9b is mixed with an Mg compound and a rare earth element compound and then fired, Mg and a rare earth element firstly form a liquid phase, and there occurs diffusion into the BCT crystal grain 9b. At this time, Ca in the BCT crystal grain 9b moves at a higher diffusion velocity than Mg and the rare earth element. Especially when Ca concentration is high Ca easily moves between particles and causes grain growth. To suppress Ca diffusion and suppress grain growth, firing temperature should be lowered, and firing conditions should be controlled strictly. However, suppressing Ca diffusion will further suppress diffusion of Mg and the rare earth element that have a lower diffusion velocity than Ca Consequently, when the BCT crystal grain 9b is used alone, there are difficulties in high-temperature firing at 1200° C. or above, and in achieving a core shell structure in which Mg and a rare earth element are present in a greater amount in the surfaces of the BCT crystal grain 9b.

However, the present invention permits a fine-grain sintered body through high-temperature which would be not easy for the case with the BCT crystal grain 9b alone. Specifically, the Ca diffusion during firing can be suppressed by the BCST crystal grain 9a coexisting with the BCT crystal 9b, thus permitting high-temperature firing of 1150° C. or above, especially 1200° C. or above. This improves the degree of sintering to allow the grain size of raw material to be substantially retained. This also facilitates the diffusion of Mg and a rare earth element that are derived from sintering additives, into the BT and BCT crystal grains, so that the formation of core shell structure of these crystal grains can be facilitated.

Additionally, in this invention, it is adjusted to attain not less than 1.003 in A/B site ratio of the whole main crystal grain 9, in which the BCT crystal grain 9b and the BCST crystal grain 9a are coexisting. In particular, it is adjusted such that at least one of the BCT crystal grain 9b and the BCST crystal grain 9a satisfies the relationship of $A/B \geq 1.003$ in mole ratio. It is therefore possible to suppress grain growth over a still wider firing temperature region, thereby stabilizing the characteristic in high-volume manufacturing.

<Manufacturing Method>

In the same manner as in the first preferred embodiment, a multilayer ceramic capacitor of the fourth preferred embodiment can be manufactured by firing a capacitor body forming body configured by alternately laminating a green sheet that contains dielectric powder and organic resin, and an internal electrode pattern. Hereat, the dielectric powder contains two or more types of mixed powders of powders that consist mainly of Ba and Ti, and differ from one another in Ca composition concentration and Sr composition concentration. Added to these mixed powders are (i) an oxide of Mg, a rare earth element and Mn; (ii) glass powder containing not more than 1 mass % of alumina; and (iii) barium carbonate powder.

Preferably, (i) 0.5 to 1.5 mass parts, in terms of oxide, of a total of Mg, a rare earth element, and Mn, (ii) 0.7 to 2 mass parts of glass powder containing not more than 1 mass % of alumina, and (iii) 0.01 to 1.2 mass part of barium carbonate powder are added to 100 mass parts of mixed powders.

As used herein, the two or more types of powders that consist mainly of Ba and Ti, and differ from one another in Ca composition concentration and Sr composition concentration are perovskite barium titanate powder in which part of A site is substituted by Ca and Sr (BCST powder), and perovskite barium titanate powder in which part of A site is substituted by Ca, and which contains no substitution Sr (BCT powder). These mixed powders are raw material powders expressed by $(Ba_{1-x-y}Ca_xSr_y)TiO_3$ and $(Ba_{1-x}Ca_x)TiO_3$, respectively.

Here, the Ca substitution amount within A site in the BCT powder is preferably x=0.005 to 0.15, especially x=0.03 to 0.09. The Ca substitution amount in A site in the BCST powder is preferably x=0.005 to 0.1, especially x=0.03 to 0.12, and y=0.005 to 0.1, especially y=0.04 to 0.13.

Either one of the BCT powder and the BCST powder is preferably not less than 1.003 in the atomic ratio of A site (barium, Ca) to B site (titanium), both of which are components of the powder. These powders can be synthesized by mixing a compound containing Ba composition, Ca composition, Sr composition, and Ti composition so as to be a predetermined composition. These dielectric powders are obtainable with a synthetic method selected from solid phase method, liquid phase method (including a method of producing through oxalate), hydrothermal synthesis method, and the like. Among dielectric powders so obtained, one obtained with hydrothermal synthesis method is suitable because of narrow particle size distribution and high crystallinity.

It is desirable that the BCT powder and the BCST powder have a particle distribution of 0.1 to 0.5 μm, in order that the dielectric layer 5 can be easily made thinner and the relative dielectric constant of dielectric powder can be increased.

In forming the dielectric layer 5, the mixing ratio of the BCST powder to the BCT powder, that is, $W_{BCT}/W_{BCST}$ ratio in mole, where $W_{BCST}$ is the amount of the BCST powder, and $W_{BCT}$ is the amount of the BCT powder, is preferably in the range of 0.05 to 20, especially 0.5 to 2, in order to increase relative dielectric constant, temperature characteristic, and DC bias characteristic in the ceramic obtained after firing.

The amount of Mg added to the mixed powder of the BCST powder and BCT powder should be 0.05 to 0.6 mass parts, especially 0.2 to 0.4 mass parts, in terms of oxide, to 100 mass parts of the above mixed powder. The amount of a rare earth element should be 0.1 to 1.7 mass part, especially 0.5 to 0.9 mass parts, in terms of oxide to 100 mass parts of the above mixed powder. The amount of Mn should be 0.1 to 0.5 mass parts, especially 0.13 to 0.19 mass parts in terms of oxide to 100 mass parts of the above mixed powder.

The glass powder can be composed of, for example, $Li_2O$, $SiO_2$, BaO, and CaO. The amount of addition of the glass powder should be 0.7 to 2 mass parts to 100 mass parts of the dielectric powder that is a mixture of BCST powder and BCT powder, in order to increase the degree of sintering of ceramic. Its composition is preferably as follows: 5 to 15 mol % of $Li_2O$, 40 to 60 mol % of $SiO_2$, 10 to 30 mol % of BaO, and 10 to 30 mol % of CaO. It is especially important for the glass powder of the invention to contain alumina in not more than 1 mass %, preferably not more than 0.1 mass %.

Barium carbonate powder is preferably 0.01 to 1.2 mass parts, especially 0.3 to 0.8 mass parts, to 100 mass parts of the mixture of BCST powder and BCT powder, in order to suppress grain growth.

In the subsequent step (b), a rectangular internal electrode pattern 23 is formed, by printing, on a main surface of the obtained ceramic green sheet 21. Conductor paste to be the internal electrode pattern 23 can be prepared by mixing, as main composition metal, Ni or Cu or their alloy powder, and ceramic powder as a common material, and adding organic binder, solvent, and dispersant. As metal powder, Ni is suitable because it permits simultaneous firing with the above-mentioned dielectric powder and it is low-cost. As ceramic powder, BCST powder containing Ca and Sr is suitable. Incorporating ceramic powder into conductor paste enables pillar-like ceramics to be formed in the internal electrode layer 7 of the invention such that it passes through an electrode layer so as to connect upper and lower dielectric layers 5. This prevents peeling between the dielectric layer 5 and the internal electrode layer 7. The ceramic powder used here can suppress abnormal grain growth of pillar-like ceramics during firing, and increase mechanical strength. The capacity temperature dependency of the multilayer ceramic capacitor can also be lowered by suppressing the abnormal grain growth of pillar-like ceramics to be formed in the internal electrode layer 7. The thickness of the internal electrode pattern 23 is preferably not more than 1 μm, in order to miniaturize the multilayer ceramic capacitor and reduce surface irregularity due to the internal electrode pattern 23.

This capacitor body forming body is then fired under temperature conditions in a predetermined atmosphere, thereby forming a capacitor body 1. In some cases, the edge portions of the capacitor body 1 may be chamfered, and barrel polishing may be performed to expose the internal electrode layers that are exposed from the opposing end surfaces in the capacitor body 1. The following conditions are suitable for this manufacturing method. That is, debinding is performed in a temperature range of up to 500° C.; a temperature raising rate is 5 to 20° C./h; the maximum temperature of firing is from 1050 to 1300° C., and 1100 to 1270° C., especially 1170 to 1240° C.; the temperature raising rate from debinding to the maximum temperature is 200 to 500° C./h; the holding time at the maximum temperature is 1 to 10 hours, the temperature lowering rate from the maximum temperature to 1000° C. is 200 to 500° C./h; the atmosphere (oxygen partial pressure $PO_2$) is $10^{-7}$ to $10^{-5}$ Pa; and the maximum temperature of heat treatment (reoxidation treatment) after firing is 900 to 1100° C. in nitrogen atmosphere.

Fifth Preferred Embodiment

A fifth preferred embodiment of the invention will next be described. Although the description overlapping with that of the first preferred embodiment has left out of the following, the fifth preferred embodiment is the same as the first preferred embodiment, except that the foregoing BCT crystal grain is replaced with BCTZ crystal grain and the BT crystal grain is replaced with BCT crystal grain. Therefore, in the following, reference is made to the same drawing as the first preferred embodiment, particularly FIG. 1 and FIG. 4. The same reference numeral "9a" as the BCT crystal grain has been retained for the BCTZ crystal grain, and the same reference numeral "9b" as BT crystal grain has been retained for the BCT crystal grain.

To achieve high capacity and high insulating property by making the dielectric layer 5 in a smaller thickness, the mean particle diameter of the BCTZ crystal grain 9a and the BCT crystal 9b is each not more than 0.4 µm, or not more than 0.7 µm in d90. On the other hand, the grain size lower limit of these crystal grains 9a and 9b is preferably not less than 0.15 µm in order to improve the relative dielectric constant of the dielectric layer 5, and suppress the temperature dependence of relative dielectric constant.

These crystal grains 9a and 9b are crystal grains that consist mainly of Ba and Ti, and differ from one another in Ca composition concentration and Zr composition concentration. These crystal grains are specifically a perovskite barium titanate crystal grain in which part of A site is substituted by Ca, and part of B site is substituted by Zr (BCTZ crystal grain 9a), and a perovskite barium titanate crystal grain in which part of A site is substituted by Ca (BCT crystal grain 9b).

That is, the crystal grains 9a and 9b contain the BCTZ crystal grain 9a and the BCT crystal grain 9b. The coexistence of the two types of crystal grains permits excellent property. The BCT crystal grain 9b can be ideally expressed by $(Ba_{1-x}Ca_x)TiO_3$. The Ca substitution amount of A site in the BCTZ crystal grain 9a is preferably x=0.01 to 0.2, especially x=0.02 to 0.07. If the Ca substitution amount is within this range, the phase transition point in the vicinity of room temperature can sufficiently shift to a low temperature side, so that the coexistent structure with the BCT crystal grain 9b can ensure excellent temperature dependency and DC bias characteristic in a temperature range for use as a capacitor. In the dielectric layer 5, the BCT crystal grain 9b is barium titanate crystal grain having not less than 0.4 atomic % of Ca composition concentration, and not more than 0.2 atomic % of Zr composition concentration, and it also includes a portion of the Zr composition contained in the BCTZ crystal grain 9a which is being slightly diffused into the BCT crystal grain 9b.

On the other hand, the BCTZ crystal grain 9a is perovskite barium titanate crystal grain containing not less than 0.4 atomic % of Ca composition concentration, and not less than 0.4 atomic % of Zr composition concentration. In particular, the Ca composition concentration is preferably 0.5 to 2.5 atomic % in order to maintain the function as a strong dielectric having a high relative dielectric constant.

The BCTZ crystal grain 9a is, as described above, perovskite barium titanate in which part of A site is substituted by Ca and part of B site is substituted by Zr. This can be ideally expressed by $(Ba_{1-x}Ca_x)_m(Ti_{1-y}Zr_y)O_3$. The Ca substitution amount in A site in the BCTZ crystal grain 9a is preferably x=0.01 to 0.2, especially x=0.02 to 0.07, and y=0.15 to 0.25, especially y=0.175 to 0.225. If the Ca substitution amount and the Zr substitution amount are within this range, the phase transition point in the vicinity of room temperature can sufficiently shift to a low temperature side, so that the coexistent structure with the BCT crystal grain 9b can ensure excellent temperature dependency and DC bias characteristic in a temperature range for use as a multilayer ceramic capacitor. If the Zr substitution amount is within the above range, there are the effects of reducing dielectric loss and increasing relative dielectric constant.

Preferably, the BCTZ crystal grain 9a and the BCT crystal grain 9b that constitute the main crystal grain 9 of the dielectric layer 5 are coexisting at a systematic rate having the following relationship: $A_{BCT}/A_{BCTZ}$=0.1 to 3, where $A_{BCTZ}$ is the rate of the BCTZ crystal grain 9a, and $A_{BCT}$ is the rate of the BCT crystal grain 9b in terms of area ratio of each crystal grain in the crystal system of the cross-sectional or surface of the dielectric layer 5, in the evaluation based on the index when defining the above-mentioned Ca concentration. In particular, $A_{BCT}/A_{BCTZ}$=0.3 to 2 is preferred in order to further improve the relative dielectric constant, temperature characteristic, and DC bias characteristic.

Both of the BCTZ crystal grain 9a and the BCT crystal grain 9b contain Mg, a rare earth element, and Mn. Their respective contents to 100 mass parts of the crystal grains 9a and 9b are as follows. The content of Mg should be 0.04 to 0.14 mass parts, especially 0.04 to 0.1 mass parts in terms of MgO. The content of a rare earth element should be 0.2 to 0.9 mass parts, especially 0.22 to 0.5 mass parts in terms of $Re_2O_3$. The content of Mn should be 0.04 to 0.15 mass parts, especially 0.05 to 0.1 mass parts in terms of $MnCO_3$ (in the case of coating, it is in the form of MnO). This permits further stabilization of the temperature characteristic of electrostatic capacity and improvement of the reliability in high-temperature load test.

The expression of characteristic of the main crystal grain 9 comprising mainly barium titanate according to the invention will next be described. In general, the BCT crystal grain 9b is a compound basically composed of the BT crystal grain 9b. Among three sequential phase transitions involved in the BT crystal grain 9b, the phase transition temperature located at the highest temperature (approximately 125° C.) remains hardly changed even if part of A site in the BT crystal grain 9b is substituted by Ca. However, the structural phase transition points in the vicinity of room temperature and at a lower temperature than that will shift to a low temperature in proportion to an increase in the amount of substitution Ca. This ensures excellent temperature characteristic and DC bias characteristic in a temperature range for use as a capacitor.

On the other hand, in the BCTZ crystal grain 9a, Ca functions as depressor that flattens the temperature characteristic of relative dielectric constant and also functions as an element to increase insulation resistance value, and Zr functions as a shifter to mainly shift Curie point to a low temperature side. Hence, the transfer points in the vicinity of room temperature and at a lower temperature are shifted to a low temperature side, thereby enabling the relative dielectric constant in the vicinity of room temperature to be extremely improved.

In other words, the dielectric ceramic of the invention attains a higher relative dielectric constant than the BT crystal grain 9b and less temperature dependency of dielectric characteristic than the BCTZ crystal grain 9a, by realizing the coexistence structure of the BCT crystal grain 9b excellent in temperature characteristic and the BCTZ crystal grain 9a having an extremely high relative dielectric constant in the vicinity of room temperature.

Additionally, the main crystal grain 9 is composed of (i) BCT crystal grain 9b that consists mainly of Ba and Ti, and is not less than 0.4 atomic % in Ca composition concentration and not more than 0.2 atomic % in Zr composition concentration; and (ii) BCTZ crystal grain 9a that is not less than 0.4 atomic % in Ca composition concentration and not less than 0.4 atomic % in Zr composition concentration. It is important to contain Mg, a rare earth element, and Mn, and also satisfy the relationship of A/B≧1.003 in mole, where A is the amount of Ba or the sun of Ba and Ca; and B is the amount of Ti or the sum of Ti and Zr. Furthermore, the mole ratio of A site (Ba, Ca) to B site (Ti, Zr) in the BCTZ crystal grain 9a, as a major component of the crystal grains constituting the main crystal grain 9, is preferably not less than 1.003. In the conventional BCTZ crystal grain, if mixed with Mg and a rare earth element, grain growth is apt to occur along with diffusion of Ca. On the other hand, the present invention can suppress particularly the grain growth of the BCTZ crystal grain 9a by defining the A/B ratio of the BCTZ crystal grain 9a as mentioned above.

The above-mentioned dielectric powder is preferably prepared by adding 0.05 to 1.5 mass parts, in terms of oxide, of the total of Mg, a rare earth element, and Mn, (ii) 1 to 1.4 mass parts of glass powder containing not more than 1 mass % of alumina, and (iii) 0.01 to 1 mass part of barium carbonate powder, to 100 mass parts of a mixed powder of perovskite barium titanate powder in which part of A site is substituted by Ca, and part of B site is substituted by Zr (BCTZ powder), and perovskite barium titanate powder in which part of A site is substituted by Ca (BCT powder).

The BCTZ powder and the BCT powder used in the invention are raw material powders expressed by $(Ba_{1-x}Ca_x)_m(Ti_{1-y}Zr_y)O_3$ and $(Ba_{1-x}Ca_x)TiO_3$, respectively. The Ca substitution amount in A site in the BCTZ powder is preferably x=0.01 to 0.2, especially x=0.02 to 0.07, and y=0.15 to 0.25, especially y=0.175 to 0.225. The Ca substitution amount in A site in the BCT powder is preferably x=0.01 to 0.2, especially x=0.02 to 0.07.

The BCTZ powder is preferably not less than 1.003 in the atomic ratio of A site (Ba, Ca) to B site (Ti, Zr), namely A/B ratio, both of which are components of the powder. The BCT powder and the BCTZ powder can be synthesized by mixing a compound containing Ba composition, Ca composition, Ti composition, and Zr composition so as to be a predetermined composition. These dielectric powders are obtainable with a synthetic method selected from solid phase method, liquid phase method (including a method of producing through oxalate), hydrothermal synthesis method, and the like. Among dielectric powders so obtained, one obtained with hydrothermal synthesis method is suitable because of narrow particle size distribution and high crystallinity.

It is desirable that BCT powder and BCTZ powder have a particle diameter of 0.15 to 0.4 µm, in order the dielectric layer 5 can be easily made thinner and the relative dielectric constant of the dielectric powder can be increased.

When the crystallinity of dielectric powder having a high relative dielectric constant is evaluated by X-ray diffraction, the ratio of a peak of index (001) $P_{AA}$ indicating tetragonal crystal to a peak of index (100) $P_{BB}$ indicating cubic crystal, namely $P_{AA}/P_{BB}$, is preferably not less than 1.1.

The mixing ratio of BCTZ powder and BCT powder, that is, $W_{BCTZ}/W_{BCT}$ ratio, where $W_{BCTZ}$ is the amount of the BCTZ powder, and $W_{BCT}$ is the amount of the BCT powder, is preferably in the range of 0.95 to 1.05, in order to further increase relative dielectric constant, temperature characteristic, and DC bias characteristic in the ceramic obtained after firing.

The amount of Mg, a rare earth element, and Mn added to the above-mentioned dielectric powder should be, in terms of oxide, 0.04 to 0.14 mass parts, 0.2 to 0.9 mass parts, 0.04 to 0.15 mass parts, respectively, to 100 mass parts of a mixed powder of BCTZ powder and BCT powder.

The glass powder can be composed of, for example, $Li_2O$, $SiO_2$, BaO, and CaO. The amount of addition of the glass powder is preferably 1 to 1.3 mass parts to 100 mass parts of the dielectric powder that is a mixed powder of BCTZ powder and the BCT powder, in order to increase the degree of sintering of ceramic. Its composition is preferably as follows: 5 to 15 mol % of $Li_2O$, 40 to 60 mol % of $SiO_2$, 10 to 30 mol % of BaO, and 10 to 30 mol % of CaO. It is especially important for the glass powder of the invention to contain alumina in not more than 1 mass %, preferably not more than 0.1 mass %. The mean particle diameter is preferably not more than 0.5 µm for the reason that the dispersibility of glass powder can be increased and the area of the grain boundary phase 11 can be narrowed.

A description will be made of the case of using other dielectric powder. Instead of a method of adding the powder of an oxide of Mg, a rare earth element, and Mn to the above mentioned BCTZ powder and the BCT powder, the method for manufacturing a multilayer ceramic capacitor according to the invention can also use dielectric powder on which powder of an oxide of Mg, a rare earth element, and Mn is previously coated. In this case, the manufacturing steps as shown in FIG. 4 remain unchanged, except for the type of dielectric powder.

That is, the method for manufacturing a multilayer ceramic of the invention includes the step of coating, with an oxide of Mg, a rare earth element, and Mn, perovskite barium titanate powder in which part of A site is substituted by Ca, and part of B site is substituted by Zr (BCTZ powder), and perovskite barium titanate powder in which part of A site is substituted by Ca (BCT powder), respectively; and adding 1 to 1.4 mass parts of glass powder containing not more than 1 mass % of alumina, and 0.01 to 1 mass part of barium carbonate, to 100 mass parts of a mixed powder of the BCTZ powder and the BCT powder.

Examples of the present invention will be described below. It is understood, however, that the examples are for the purpose of illustration and the invention is not to be regarded as limited to any of the specific materials or condition therein.

EXAMPLES

Example I

A multilayer ceramic capacitor was manufactured as follows. Tables 1 and 2 show the type, mean particle diameter, and amount of addition of raw material powders, and firing temperature. The ratio of A mole to B mole (site ratio) of BT powder and BCT powder used herein were 1.003, but that of Sample No. I-9 and I-10 was 1.001. The particle diameter of the main body of the BT and the BCT powder was 0.2 to 0.4 µm. The composition of glass powder was as follows: $SiO_2$=50; BaO=20; CaO=20; and $Li_2O$=10 (mol %). In Tables 1 and 2, the terms "with coating" and "without coating" indicate whether or not BT powder and BCT powder had coating of an oxide of Mg, Y, and Mn. Glass powder containing alumina by the amount as shown in Tables 1 and 2 was used.

Wet mixing of the above powders was performed using zirconia balls having a diameter of 5 mm. A mixed solvent of toluene and alcohol was added thereto. To the obtained powder, polyvinyl butyral resin and a mixed solvent of toluene and alcohol were added, followed by a similar wet mixing using zirconia balls having a diameter of 5 mm, thereby preparing a ceramic slurry. A ceramic green sheet having a thickness of 3 µm was prepared using the ceramic slurry by doctor blade method.

A plurality of rectangular internal electrode patterns mainly composed of Ni were formed on the upper surface of the ceramic green sheet. In a conductor paste used in the internal electrode pattern, the mean particle diameter of Ni powder was 0.3 µm, and 30 mass parts of BT powder used as a common material in the green sheet was added to 100 mass parts of the Ni powder.

Subsequently, 360 ceramic green sheets with an internal electrode pattern printed thereon were laminated to obtain a laminate. Then, 20 ceramic green sheets free from an internal electrode pattern were laminated on the upper and lower surfaces of the laminate, respectively, and then subjected to batch laminating with a press machine under the conditions of: 60° C. in temperature, $10^7$ Pa in pressure, and 10 minutes in time. The obtained laminate was then cut in predetermined dimensions to obtain a multilayer forming body.

The obtained multilayer forming body was subjected to debinding process at a temperature raising rate of 10° C./h and at 300° C. in the atmosphere. With the temperature rising rate from 500° C. set at 300° C./h, firing was performed at 1150 to 1200° C. in hydrogen-nitrogen atmosphere for two hours, followed by cooling down to 1000° C. at a temperature lowering rate of 300° C./h, and reoxidation treatment at 1000° C. in nitrogen atmosphere for four hours, and cooling at a temperature lowering rate of 300° C./h. Thus, a capacitor body was prepared. This capacitor body had a size of 2×1.3×1.3 mm$^3$, and a dielectric layer had a thickness of 2 μm.

After the fired electronic component body was subjected to barrel polishing, external electrode paste containing Cu powder and glass powder was applied to both ends of the electronic component body, followed by baking at 850° C, to form external electrodes. Thereafter, with an electrolytic barrel machine, Ni and Sn were plated in this order on the surfaces of the external electrodes, resulting in a multilayer ceramic capacitor.

The dielectric layer constituting the above multilayer ceramic capacitor had the following relationship: $A_{BT}/A_{BCT}$=0.8 to 1.2, where $A_{BCT}$ is the rate of BCT crystal grain, and $A_{BT}$ is the rate of BT crystal grain in terms of area ratio of each crystal grain in the crystal system of the cross-sectional of the dielectric layer. A rare earth element (yttrium) contained in barium titanate crystal grain exhibited the highest concentration at a grain boundary phase as a grain surface, and had a concentration gradient of not less than 0.05 atomic %/nm from the surface to the interior of the crystal grain.

The multilayer ceramic capacitors so obtained were evaluated as follows:

(1) Electrostatic capacity, relative dielectric constant, and the temperature characteristic of relative dielectric constant were measured under a frequency of 1.0 kHz and a measured voltage of 0.5Vrms.

(2) The relative dielectric constant was calculated from the electrostatic capacity, the effective area of an internal electrode layer, and the thickness of a dielectric layer.

(3) High-temperature test of 30 samples was conducted under a temperature 125° C., a voltage of 9.45V, and evaluation was made up to 1000 hours (MTTF).

(4) The mean particle diameter of BT crystal grains and BCT crystal grains constituting a dielectric layer was found by a scanning electron microscope (SEM). After etching the polished surface, 20 crystal grains were randomly selected from the microphotograph, and the maximum diameter of each crystal grain was found by intercept method, and the average value and D90 (a 90% accumulated value from small diameter to large diameter) were found.

(5) The Ca concentration of an arbitrary location in the vicinity of the core was analyzed by using a transmission electron microscope and an EDS (elementary analysis apparatus). When Ca concentration was not less than 0.4 atomic % (round to one decimal), it was regarded as a dielectric particle having a high Ca concentration. Thus, 100 to 150 main crystal grains were analyzed.

(6) The grain boundary phase was evaluated by another measurement using above-mentioned alternating current impedance method. In this case, high-temperature load conditions were 250° C. in temperature and 3V in voltage applied to the external electrodes of a multilayer ceramic capacitor. Measurement was performed at a voltage of 0.1 V and a frequency of between 10 mHz and 10 kHz. Before and after the process, the alternating current impedances of 30 samples were evaluated.

As a comparative example, a sample was manufactured by adding no barium carbonate into a mixed powder of BT powder and BCT powder, and a sample was manufactured by applying a coating of Mg, Y, and Mn to BT powder, and no coating to BCT powder (Both samples were 1.001 in A/B mole ratio). The results were shown in Tables 1 to 4.

TABLE 1

| Sample No. | BT powder | | | | BCT powder | | | | Glass powder | | | | |
|---|---|---|---|---|---|---|---|---|---|---|---|---|---|
| | Coating | Amount of addition | | | Coating | Amount of addition | | | Mean particle diameter μm | Amount of addition mass parts | Alumina mass % | BaCO3 mass parts | Firing temperature ° C. |
| | | Mg mass parts | Y mass parts | Mn mass parts | | Mg mass parts | Y mass parts | Mn mass parts | | | | | |
| I-1 | With coating | 0.007 | 0.041 | 0.008 | With coating | 0.022 | 0.09 | 0.023 | 0.5 | 1.2 | 0.08 | 0.43 | 1155 1170 1185 1200 |
| I-2 | With coating | 0.011 | 0.061 | 0.015 | With coating | 0.0325 | 0.185 | 0.0345 | 0.5 | 1.2 | 0.06 | 0.43 | 1155 1170 1185 1200 |
| I-3 | With coating | 0.022 | 0.122 | 0.023 | With coating | 0.065 | 0.37 | 0.069 | 0.5 | 1.2 | 0.08 | 0.43 | 1155 1170 1185 1200 |
| I-4 | With coating | 0.033 | 0.183 | 0.0345 | With coating | 0.0375 | 0.555 | 0.1035 | 0.5 | 1.2 | 0.06 | 0.43 | 1155 1170 1185 1200 |

TABLE 1-continued

| | BT powder | | | | | BCT powder | | | Glass powder | | | | |
|---|---|---|---|---|---|---|---|---|---|---|---|---|---|
| | | Amount of addition | | | | Amount of addition | | | Mean particle | Amount of | | BaCO3 | Firing |
| Sample No. | Coating | Mg mass parts | Y mass parts | Mn mass parts | Coating | Mg mass parts | Y mass parts | Mn mass parts | diameter μm | addition mass parts | Alumina mass % | mass parts | temperature °C. |
| I-5 | With coating | 0.044 | 0.244 | 0.046 | With coating | 0.13 | 0.74 | 0.138 | 0.5 | 1.2 | 0.08 | 0.43 | 1155 1170 1185 1200 |
| I-6 | Without coating | 0.022 | 0.122 | 0.023 | Without coating | 0.065 | 0.37 | 0.069 | 0.5 | 1.2 | 0.06 | 0.43 | 1155 1170 1185 1200 |
| I-7 | With coating | 0.022 | 0.122 | 0.023 | With coating | 0.065 | 0.37 | 0.069 | 0.5 | 1.2 | 0.08 | 0.215 | 1155 1170 1185 1200 |

Sample marked '*' is out of the scope of the present invention.

TABLE 2

| | BT powder | | | | | BCT powder | | | Glass powder | | | | |
|---|---|---|---|---|---|---|---|---|---|---|---|---|---|
| | | Amount of addition | | | | Amount of addition | | | Mean particle | Amount of | | BaCO3 | Firing |
| Sample No. | Coating | Mg mass parts | Y mass parts | Mn mass parts | Coating | Mg mass parts | Y mass parts | Mn mass parts | diameter μm | addition mass parts | Alumina mass % | mass parts | temperature °C. |
| I-8 | With coating | 0.022 | 0.122 | 0.023 | With coating | 0.065 | 0.37 | 0.069 | 0.5 | 1.2 | 0.08 | 0.645 | 1155 1170 1185 1200 |
| *I-9 | With coating | 0.022 | 0.122 | 0.023 | With coating | 0.065 | 0.37 | 0.659 | 0.5 | 1.2 | 0.06 | 0 | 1155 1170 1185 1200 |
| *I-10 | With coating | 0.2 | 1 | 0.1 | Without coating | 0 | 0 | 0 | 0.5 | 1.2 | 1.3 | 0 | 1155 1170 1185 1200 |
| I-11 | Without coating | 0.022 | 0.122 | 0.023 | Without coating | 0.065 | 0.37 | 0.069 | 0.5 | 1.2 | 1.3 | 0.43 | 1155 1170 1185 1200 |
| I-12 | With coating | 0.043 | 0.246 | 0.046 | With coating | 0.043 | 0.248 | 0.048 | 0.5 | 1.2 | 0.08 | 0.43 | 1155 1170 1185 1200 |
| I-13 | With coating | 0.022 | 0.122 | 0.023 | With coating | 0.065 | 0.27 | 0.069 | 0.5 | 0.8 | 0.08 | 0.43 | 1155 1170 1185 1200 |

Sample marked '*' is out of the scope of the present invention.

TABLE 3

| Sample No. | Mean particle diameter of crystal grain (BT, BCT) after firing μm | Particle diameter (D90) of crystal grain (BT, BCT) after firing | A/B site ratio (A:Ba, Ca, B:Ti) | Electrostatic capacity μF | Relative dielectric constant | Rate of temperature change of electrostatic capacity at 125° C. % |
|---|---|---|---|---|---|---|
| I-1 | 0.27 | 0.44 | 1.005 | 9.4 | 3510 | −13.9 |
| | 0.27 | 0.44 | | 9.4 | 3510 | −13.7 |
| | 0.28 | 0.45 | | 9.3 | 3560 | −13.7 |
| | 0.26 | 0.45 | | 9.3 | 3610 | −13.6 |
| I-2 | 0.26 | 0.43 | 1.005 | 9.4 | 3500 | −13.9 |

TABLE 3-continued

| Sample No. | | | | | | |
|---|---|---|---|---|---|---|
| | 0.26 | 0.43 | | 9.4 | 3500 | −13.7 |
| | 0.27 | 0.44 | | 9.3 | 3550 | −13.7 |
| | 0.27 | 0.44 | | 9.3 | 3600 | −13.6 |
| I-3 | 0.25 | 0.42 | 1.005 | 9.4 | 3500 | −13.9 |
| | 0.25 | 0.42 | | 9.4 | 3500 | −13.7 |
| | 0.26 | 0.44 | | 9.3 | 3550 | −13.7 |
| | 0.26 | 0.44 | | 9.3 | 3600 | −13.6 |
| I-4 | 0.24 | 0.41 | 1.005 | 9.3 | 3400 | −15 |
| | 0.24 | 0.41 | | 9.3 | 3400 | −14.8 |
| | 0.25 | 0.42 | | 9.2 | 3450 | −14.5 |
| | 0.25 | 0.42 | | 9.2 | 3500 | −14.4 |
| I-5 | 0.25 | 0.44 | 1.005 | 9 | 3200 | −17 |
| | 0.25 | 0.44 | | 9 | 3200 | −16.8 |
| | 0.26 | 0.48 | | 9.1 | 3250 | −16.2 |
| | 0.26 | 0.47 | | 9.1 | 3250 | −18 |
| I-6 | 0.27 | 0.48 | 1.005 | 9 | 3540 | −14 |
| | 0.27 | 0.48 | | 9 | 3380 | −14.7 |
| | 0.28 | 0.5 | | 5.5 | 3500 | −12 |
| | 0.28 | 0.51 | | 8.7 | 3540 | −10.5 |
| I-7 | 0.3 | 0.51 | 1.003 | 9.5 | 3600 | −14.9 |
| | 0.3 | 0.52 | | 9.5 | 3600 | −14.7 |
| | 0.31 | 0.53 | | 9.4 | 3650 | −14.7 |
| | 0.32 | 0.54 | | 9.4 | 3800 | −14.8 |

| Sample No. | Compliance with XTR standard | BDV V | Initial defect occurrence time (125° C. × 9.45 V) Hours | High-temperature load test (125° C., 9.45 V, 1000 hours) Defect | Evaluation on grain boundary layer by alternating current impedance method Rate of resistance change before and after high-temperature loading %/min. |
|---|---|---|---|---|---|
| I-1 | ○ | 141 | 988 | Exist | −1.07 |
| | ○ | 143 | 884 | Exist | −1.06 |
| | ○ | 150 | 680 | Exist | −1.05 |
| | ○ | 152 | 510 | Exist | −1.06 |
| I-2 | ○ | 163 | 3400 | Nothing | −0.5 |
| | ○ | 163 | 3060 | Nothing | −0.6 |
| | ○ | 164 | 2448 | Nothing | −0.6 |
| | ○ | 165 | 1734 | Nothing | −0.6 |
| I-3 | ○ | 165 | 3699 | Nothing | −0.3 |
| | ○ | 157 | 3393 | Nothing | −0.3 |
| | ○ | 157 | 2720 | Nothing | −0.4 |
| | ○ | 158 | 1553 | Nothing | −0.4 |
| I-4 | ○ | 165 | 3699 | Nothing | −0.3 |
| | ○ | 157 | 3393 | Nothing | −0.3 |
| | ○ | 157 | 2720 | Nothing | −0.4 |
| | ○ | 159 | 1863 | Nothing | −0.4 |
| I-5 | X | 169 | 3740 | Nothing | −0.2 |
| | X | 159 | 3400 | Nothing | −0.2 |
| | X | 159 | 2890 | Nothing | −0.3 |
| | X | 160 | 1904 | Nothing | −0.3 |
| I-6 | ○ | 127 | 1088 | Nothing | −0.5 |
| | ○ | 137 | 1190 | Nothing | −0.5 |
| | ○ | 124 | 1122 | Nothing | −0.8 |
| | ○ | 107 | 1020 | Nothing | −0.8 |
| I-7 | ○ | 154 | 3366 | Nothing | −0.7 |
| | ○ | 158 | 2992 | Nothing | −0.7 |
| | ○ | 145 | 2448 | Nothing | −0.8 |
| | ○ | 139 | 1768 | Nothing | −1 |

Sample marked '*' is out of the scope of the present invention.

TABLE 4

| Sample No. | Mean particle diameter of crystal grain (BT, BCT) after firing μm | Particle diameter (D90) of crystal grain (BT, BCT) after firing | A/B site ratio (A:Ba, Ca, B:Ti) | Electrostatic capacity μF | Relative dielectric constant | Rate of temperature change of electrostatic capacity at 125° C. % |
|---|---|---|---|---|---|---|
| I-8 | 0.24 | 0.4 | 1.007 | 9.2 | 3300 | −13.8 |
| | 0.24 | 0.4 | | 9.2 | 3300 | −13.6 |
| | 0.25 | 0.41 | | 9.1 | 3350 | −13.6 |
| | 0.25 | 0.41 | | 9.1 | 3400 | −13.5 |

TABLE 4-continued

| Sample No. | | | | | | |
|---|---|---|---|---|---|---|
| *I-9 | 0.3 | 0.54 | 1.001 | 9.8 | 3650 | −16.5 |
| | 0.3 | 0.54 | | 9.7 | 3650 | −16.2 |
| | 0.31 | 0.55 | | 9.6 | 3700 | −15.6 |
| | 0.32 | 0.55 | | 9.5 | 3700 | −15.6 |
| *I-10 | 0.4 | 0.61 | 1.001 | 8.9 | 3100 | −16.5 |
| | 0.4 | 0.61 | | 9 | 3150 | −14.9 |
| | 0.44 | 0.67 | | 9.1 | 3180 | −15 |
| | 0.49 | 0.72 | | 9.2 | 3230 | −15.8 |
| I-11 | 0.26 | 0.47 | 1.005 | 8.9 | 3340 | −14.9 |
| | 0.26 | 0.47 | | 8.9 | 3180 | −15 |
| | 0.27 | 0.48 | | 8.7 | 3200 | −12.9 |
| | 0.27 | 0.5 | | 8.6 | 3240 | −11.4 |
| I-12 | 0.25 | 0.42 | 1.005 | 9.4 | 3170 | −14.9 |
| | 0.25 | 0.42 | | 9.4 | 3060 | −13.3 |
| | 0.26 | 0.44 | | 9.3 | 3130 | −11.5 |
| | 0.26 | 0.44 | | 9.3 | 3320 | −11.1 |
| I-13 | 0.25 | 0.42 | 1.005 | 9.4 | 3500 | −14.4 |
| | 0.25 | 0.42 | | 9.4 | 3500 | −14.2 |
| | 0.26 | 0.44 | | 9.3 | 3550 | −14.2 |
| | 0.26 | 0.44 | | 9.3 | 3600 | −14.1 |

| Sample No. | Compliance with XTR standard | BDV V | Initial defect occurrance time (125° C. × 9.45 V) Hours | High-temperature load test (125° C., 9.46 V, 1000 hours) Defect | Evaluation on grain boundary layer by alternating current impedance method Rate of resistance change before and after high-temperature loading %/min. |
|---|---|---|---|---|---|
| I-8 | ○ | 167 | 3740 | Nothing | −0.5 |
| | ○ | 160 | 3434 | Nothing | −0.5 |
| | ○ | 150 | 2822 | Nothing | −0.6 |
| | ○ | 142 | 1836 | Nothing | −0.6 |
| *I-9 | X | 128 | 850 | Exist | −1.08 |
| | X | 126 | 748 | Exist | −1.07 |
| | X | 120 | 646 | Exist | −1.06 |
| | X | 115 | 544 | Exist | −1.07 |
| *I-10 | X | 129 | 850 | Exist | −1.08 |
| | ○ | 127 | 952 | Exist | −1.07 |
| | ○ | 123 | 1054 | Nothing | −0.8 |
| | X | 120 | 510 | Exist | −1.3 |
| I-11 | ○ | 127 | 1122 | Nothing | −0.5 |
| | ○ | 137 | 1190 | Nothing | −0.5 |
| | ○ | 124 | 1158 | Nothing | −0.8 |
| | ○ | 107 | 1020 | Nothing | −0.6 |
| I-12 | ○ | 151 | 3804 | Nothing | −0.4 |
| | ○ | 136 | 3298 | Nothing | −0.4 |
| | ○ | 145 | 2720 | Nothing | −0.5 |
| | ○ | 154 | 2346 | Nothing | −0.5 |
| I-13 | ○ | 165 | 3740 | Nothing | −0.3 |
| | ○ | 157 | 3434 | Nothing | −0.3 |
| | ○ | 157 | 2856 | Nothing | −0.4 |
| | ○ | 158 | 2040 | Nothing | −0.4 |

Sample marked '*' is out of the scope of the present invention.

As apparent from the results of Tables 1 to 4, in Samples I-1 to I-8 and I-11 to I-13, corresponding to the present invention, to which Mg, Y, and Mn were incorporated in BT powder and BCT powder, and the A/B mole ratio of Ba and Ti was not less than 1.003, over the entire temperature region of samples fired at a firing temperature of 1150 to 1200° C., the relative dielectric constant was not less than 3080, the temperature characteristic was not more than −17% at 125° C., and the breakdown voltage (BDV) was not less than 107V. In high-temperature load test (125° C., 9.45V), endurance time was not less than 510 hours, and the rate of resistance change by alternating impedance method was not more than −1.07%/min.

In Samples Nos. I-2 to I-4, I-6 to I-8, I-12, and I-13, employing dielectric powder in which a coating of Mg, Y, and Mn was applied in a predetermined amount to BT powder and BCT powder, and the A/B mole ratio of Ba and Ti was not less than 1.003, and the coating amount of Mg, a rare earth element, and Mn was defined, the relative dielectric constant was not less than 3080, the temperature characteristic was not more than −15% at 125° C., the breakdown voltage (BVD) was not less than 107V. In high-temperature load test (125° C., 9.45 V, 1000 hours), no defect occurred, and the rate of resistance change by alternating current impedance method was not more than −1%/min.

On the other hand, in Sample No. I-9 in which no barium carbonate was added to BT powder and BCT powder that ware not more than 1.001 in the A/B mole ratio, and Sample No. I-10 in which Mg, Y, and M were coated only to BT powder, and no coating was applied to BCT powder, over the temperature region where firing was performed at a firing temperature of 1150 to 1200° C., the characteristic at 1770° C. was approximately the same relative dielectric constant as the above Samples of the invention. However, the samples fired at a temperature higher than 1170° C., namely not less than 1185° C., or a temperature of 1550° C., had a large temperature characteristic of electrostatic capacity. The maximum rate of resistance change by alternating current impedance method was not more than −1.08%/min.

Example II

A multilayer ceramic capacitor was manufactured as follows. Table 5 shows the type, mean particle diameter, and amount of addition of raw material powders, and firing temperature. The A/B site ratio in respect to BT powder and BST powder used herein were 1.001 or 1.003. The particle diameter of the main body of the BT and the BST powder was 0.2 to 0.4 μm. The composition of glass powder was as follows: $SiO_2$=50; BaO=20; CaO=20; and $Li_2O$=10 (mol %). In Table 5, the terms "with coating" and "without coating" indicate whether or not BT powder and BST powder had a coating of an oxide of Mg, Y, and Mn. Glass powder containing alumina by the amount as shown in Table 5 was used.

Wet mixing of the above powders was performed using zirconia balls having a diameter of 5 mm. A mixed solvent of toluene and alcohol was added thereto. To the obtained powder, polyvinyl butyral resin and a mixed solvent of toluene and alcohol were added, followed by a similar wet mixing using zirconia balls having a diameter of 5 mm, thereby preparing a ceramic slurry. A ceramic green sheet having a thickness of 3 μm was prepared by doctor blade method.

A plurality of rectangular internal electrode patterns mainly composed of Ni were formed on the upper surface of the ceramic green sheet. In a conductor paste used in the internal electrode pattern, the mean particle diameter of Ni powder was 0.3 μm, and 30 mass parts of BT powder used as a common material in the green sheet was added to 100 mass parts of the Ni powder.

Subsequently, 360 ceramic green sheets with an internal electrode pattern printed thereon were laminated to obtain a laminate. Then, 20 ceramic green sheets free from an internal electrode pattern were laminated on the upper and lower surface of the laminate, respectively, and then subjected to batch laminating with a press machine under the conditions of: 60° C. in temperature, $10^7$ Pa in pressure, and 10 minutes in time. The obtained laminate was then cut in predetermined dimensions to obtain a multilayer forming body.

The obtained multilayer forming body was subjected to debinding process at a temperature raising rate of 10° C./h and at 300° C. in the atmosphere. With the temperature raising rate form 500° C. set at 300° C./h, firing was performed at 1155 to 1200° C. (oxygen partial pressure of $10^{-6}$ Pa) for two hours, followed by cooling down to 1000° C. at a temperature lowering rate of 300° C./h, and reoxidation treatment at 1000° C. in nitrogen atmosphere for four hours, and cooling at a temperature lowering rate of 300° C./h. Thus a capacitor body was prepared. This capacitor body had a size of 2×1×1 $mm^3$, and a dielectric layer had a thickness of 2 μm.

After the fired electronic component body was subjected to barrel polishing, external electrode paste containing Cu powder and glass powder was applied to both ends of the electronic component body, followed by baking at 850° C. to form external electrodes. Thereafter, with an electrolytic barrel machine, Ni and Sn were plated in this order on the surfaces of the external electrodes, resulting in a multilayer ceramic capacitor.

The dielectric layer constituting the above multilayer ceramic capacitor had the following relationship: $A_{BT}/A_{BST}$=0.8 to 1.2, where $A_{BST}$ is the rate of BST crystal grain, and $A_{BT}$ is the rate of BT crystal grain in terms of area ratio of each crystal grain in the crystal system of the cross-sectional of the dielectric layer. A rare earth element (yttrium) contained in barium titanate crystal grain exhibited the highest concentration at a grain boundary phase as a grain surface, and had a concentration gradient of not less than 0.05 atomic %/nm from the surface to the interior of the crystal grain.

The multilayer ceramic capacitors so obtained were evaluated in the same manner as in EXAMPLE I. The Sr concentration of an arbitrary location in the vicinity of the core was analyzed by using a transmission electron microscope and an EDS (elementary analysis apparatus). When Sr concentration was not less than 0.4 atomic % (round to one decimal), it was regarded as a dielectric particle having a high Sr concentration. Thus, 100 to 150 main crystal grains were analyzed.

TABLE 5

| Sample No. | BT powder | | | | | BST powder | | | | | Glass powder | | | | Firing temperature ° C. |
| | Coating | A/B | Amount of addition | | | Coating | A/B | Amount of addition | | | Mean particle diameter μm | Amount of addition mass parts | Alumina mass % | $BaCO_3$ mass parts | |
| | | | Mg mass parts | Y mass parts | Mn mass parts | | | Mg mass parts | Y mass parts | Mn mass parts | | | | | |
| II-1 | With coating | 1.003 | 0.022 | 0.122 | 0.023 | With coating | 1.003 | 0.065 | 0.27 | 0.069 | 0.5 | 1.2 | 0.08 | 0.43 | 1155 1170 1185 1200 |
| II-2 | With coating | 1.003 | 0.022 | 0.122 | 0.023 | With coating | 1.003 | 0.065 | 0.37 | 0.069 | 0.5 | 1.2 | 1.5 | 0.43 | 1155 1170 1185 1200 |
| II-3 | With coating | 1.003 | 0.022 | 0.122 | 0.023 | With coating | 1.003 | 0.065 | 0.37 | 0.069 | 0.5 | 1.2 | 0.06 | 0.43 | 1155 1170 1185 1200 |
| II-4 | Without coating | 1.003 | 0.022 | 0.122 | 0.023 | Without coating | 1.003 | 0.065 | 0.37 | 0.069 | 0.5 | 1.2 | 0.08 | 0.43 | 1155 1170 1185 1200 |

TABLE 5-continued

| | BT powder | | | | | BST powder | | | | | Glass powder | | | | |
|---|---|---|---|---|---|---|---|---|---|---|---|---|---|---|---|
| | | | Amount of addition | | | | | Amount of addition | | | Mean | | | | |
| Sample No. | Coating | A/B | Mg mass parts | Y mass parts | Mn mass parts | Coating | A/B | Mg mass parts | Y mass parts | Mn mass parts | particle diameter μm | Amount of addition mass parts | Alumina mass % | BaCO₃ mass parts | Firing temperature °C. |
| II-5 | With coating | 1.003 | 0.043 | 0.248 | 0.045 | With coating | 1.003 | 0.043 | 0.248 | 0.048 | 0.5 | 1.2 | 0.08 | 0.43 | 1155 1170 1185 1200 |
| *II-6 | With coating | 1.001 | 0.022 | 0.122 | 0.023 | With coating | 1.001 | 0.065 | 0.37 | 0.059 | 0.5 | 1.2 | 0.08 | 0 | 1155 1170 1185 1200 |

Sample marked '*' is out of the scope of the present invention.

TABLE 6

| Sample No. | Mean particle diameter of crystal grain (BT, BST) after firing μm | Particle diameter (D90) of crystal grain (BT, BST) after firing | A/B site ratio (A:Bs, Sr, B: TI) | Electrostatic capacity μF | Relative dielectric constant | Rate of temperature change of electrostatic capacity at 125° C. % | Compliance with K7R standard | High-temperature load test(125° C., 9.45 V, 1000 hours) Defect |
|---|---|---|---|---|---|---|---|---|
| II-1 | 0.25 | 0.42 | 1.005 | 9.6 | 3610 | −14.4 | ○ | Nothing |
| | 0.25 | 0.43 | | 9.5 | 3610 | −14.2 | ○ | Nothing |
| | 0.26 | 0.45 | | 9.6 | 3620 | −14.2 | ○ | Nothing |
| | 0.26 | 0.45 | | 9.6 | 3620 | −14.1 | ○ | Nothing |
| II-2 | 0.26 | 0.43 | 1.005 | 9.6 | 3620 | −14.5 | ○ | Nothing |
| | 0.27 | 0.45 | | 9.6 | 3620 | −14.7 | ○ | Nothing |
| | 0.28 | 0.5 | | 9.7 | 3640 | −15 | ○ | Nothing |
| | 0.3 | 0.51 | | 9.8 | 3660 | −15.4 | X | Exist |
| II-3 | 0.27 | 0.44 | 1.003 | 9.7 | 3640 | −14.7 | ○ | Nothing |
| | 0.27 | 0.45 | | 9.6 | 3620 | −14.5 | ○ | Nothing |
| | 0.28 | 0.47 | | 9.4 | 3560 | −14.5 | ○ | Nothing |
| | 0.28 | 0.47 | | 9.4 | 3580 | −14.4 | ○ | Nothing |
| II-4 | 0.28 | 0.44 | 1.005 | 9.7 | 3640 | −14.7 | ○ | Nothing |
| | 0.28 | 0.45 | | 9.6 | 3620 | −14.6 | ○ | Nothing |
| | 0.29 | 0.47 | | 9.4 | 3580 | −14.5 | ○ | Nothing |
| | 0.29 | 0.47 | | 9.3 | 3570 | −14.5 | ○ | Nothing |
| II-5 | 0.26 | 0.43 | 1.005 | 9.6 | 3820 | −14.7 | ○ | Nothing |
| | 0.26 | 0.43 | | 9.5 | 3610 | −14.5 | ○ | Nothing |
| | 0.27 | 0.46 | | 9.4 | 3580 | −14.5 | ○ | Nothing |
| | 0.28 | 0.46 | | 9.4 | 3580 | −14.4 | ○ | Nothing |
| *II-6 | 0.27 | 0.44 | 1.001 | 9.6 | 3660 | −15.5 | X | Exist |
| | 0.28 | 0.46 | | 9.7 | 3650 | −15 | ○ | Nothing |
| | 0.29 | 0.5 | | 9.7 | 3650 | −15.1 | ○ | Exist |
| | 0.3 | 0.52 | | 9.8 | 3710 | −15.1 | X | Exist |

Sample marked '*' is out of the scope of the present invention.

As apparent from the results of Tables 5 and 6, in Samples corresponding to the present invention, in which Mg, Y, and Mn were incorporated in BT powder and BST powder, and the A/B site ratio in respect to Ba and Ti was not less than 1.003, except for Sample No. II-2 using glass powder containing a large amount of alumina, over the entire temperature region of samples fired at a firing temperature of 1155 to 1200° C., the relative dielectric constant was not less than 3500, the temperature characteristic was not more than −15% at 125° C., and the breakdown voltage (BDV) was not less than 150V. In high-temperature load test (125° C., 9.45V), endurance time was not less than 1000 hours.

On the other hand, in Sample No. II-6 in which no barium carbonate was added to BT powder and BST powder that were not more than 1.001 in the A/B site ratio, over the temperature region where firing was performed at a firing temperature of 1155 to 1200° C., the characteristic at 1170° C. was approximately the same relative dielectric consent as the above Samples of the invention. However, the samples fired at a temperature higher than 1170° C., namely not less than 1185° C. or a temperature of 1150° C. had a large temperature characteristic of electrostatic capacity, and had no durability in high-temperature load test (125° C., 9.45V). In the samples in which the content of alumina in glass powder was beyond the range of the invention, the temperature characteristic of sample fired at 1200° C. did not satisfy X7R characteristic and high-temperature load lifetime.

Example III

A multilayer ceramic capacitor was manufactured as follows. Table 7 shows the type, mean particle diameter, and amount of addition of raw material powders, and firing temperature. The A/B site ratio in respect to BT powder and BCTZ powder used herein were 1.001 or 1.003. The particle diameter of the main body of the BT and the BCTZ powder was 0.2 to 0.4 μm. The BCTZ powder had a composition of $(Ba_{0.95}Ca_{0.05})_m(Ti_{0.8}Zr_{0.2})O_3$. The glass powder had the content of alumina as shown in Table 7, and its composition was as follows: $SiO_2$=50; BaO=20; CaO=20; and $Li_2O$=10 (mol %). In Table 7, the terms "with coating" and "without coating" indicate whether or not BT powder and BCTZ powder had a coating of an oxide of Mg, Y, and Mn.

Wet mixing of the above powders was performed using zirconia balls having a diameter of 5 mm. A mixed solvent of toluene and alcohol was added thereto. To the obtained powder, polyvinyl butyral resin and a mixed solvent of toluene and alcohol were added, followed by a similar wet mixing using zirconia balls having a diameter of 5 mm, thereby preparing a ceramic slurry. A ceramic green sheet having a thickness of 3 μm was prepared by doctor blade method.

A plurality of rectangular internal electrode patterns mainly composed of Ni were formed on the upper surface of the ceramic green sheet, and a ceramic pattern having the same ceramic composition as the ceramic green sheet was formed therearound at substantially the same height. In a conductor paste used in the internal electrode pattern, the mean particle diameter of Ni powder was 0.3 μm, and 30 mass parts of BT powder used as a common material in the green sheet was added to 100 mass part of the Ni powder.

Subsequently, 360 ceramic green sheets with an internal electrode pattern printed thereon were laminated to obtain a laminate. Then, 20 ceramic green sheets free from an internal electrode pattern were laminated on the upper and lower surfaces of the laminate, respectively, and then subjected to batch laminating with a press machine under the conditions of: 60° C. in temperature, $10^7$ Pa in pressure, and 10 minutes in time. The obtained laminate was then cut in predetermined dimensions to obtain a multilayer forming body.

The obtained multilayer forming body was subjected to debinding process at a temperature raising rate of 10° C./h and at 300° C. in the atmosphere. With the temperature raising rate from 500° C. set at 300° C./h firing was performed at 1155 to 1245° C. (oxygen partial pressure of $10^{-6}$ Pa) for two hours, followed by cooling down to 1000° C. at a temperature lowering rate of 300° C./h, and reoxidation treatment at 1000° C. in nitrogen atmosphere for four hours, and cooling at a temperature lowering rate of 300° C./h. Thus, a capacitor body was prepared. This capacitor body had a size of 2×1.3× 1.3 $mm^3$, and a dielectric layer had a thickness of 2 μm.

After the fired electronic component body was subjected to barrel polishing, external electrode paste containing Cu powder and glass powder was applied to both ends of the electronic component body, followed by baking at 850° C. to form external electrodes. Thereafter, with an electrolytic barrel machine, Ni and Sn were plated in this order on the surfaces of the external electrodes, resulting in a multilayer ceramic capacitor.

The dielectric layer constituting the above multilayer ceramic capacitor had the following relationship: $A_{BT}/A_{BCTZ}$=0.8 to 1.2, where $A_{BCTZ}$ is the rate of BCTZ crystal grain, and $A_{BT}$ is the rate of BT crystal grain in terms of area ratio of each crystal grain in the crystal system of the cross-sectional of the dielectric layer. A rare earth element (yttrium) contained in barium titanate crystal grain exhibited the highest concentration at a grain boundary phase as a grain surface, and had a concentration gradient of not less than 0.05 atomic %/nm from the surface to the interior of the crystal grain.

The multilayer ceramic capacitors so obtained were evaluated for 100 samples in the same manner as in EXAMPLE I.

The mean particle diameters of the BT crystal grain and the BCTZ crystal grain, each constituting the dielectric layer, were determined by using five samples.

TABLE 7

| Sample No. | BT powder | | | | | BCTZ powder | | | | | Glass powder | | | $BaCO_3$ mass parts | Firing temperature ° C. |
| | Coating | A/B | Mg mass parts | Y mass parts | Mn mass parts | Coating | A/B | Mg mass parts | Y mass parts | Mn mass parts | Mean particle diameter μm | Amount of addition mass parts | Alumina mass % | | |
| --- | --- | --- | --- | --- | --- | --- | --- | --- | --- | --- | --- | --- | --- | --- | --- |
| III-1 | With coating | 1.003 | 0.024 | 0.104 | 0.025 | With coating | 1.003 | 0.066 | 0.328 | 0.076 | 0.3 | 1.2 | 0.08 | 0.43 | 1155 1185 1215 1245 |
| III-2 | With coating | 1.003 | 0.024 | 0.104 | 0.025 | With coating | 1.003 | 0.066 | 0.328 | 0.076 | 0.3 | 1.2 | 1.5 | 0.43 | 1155 1185 1215 1245 |
| III-3 | With coating | 1.001 | 0.011 | 0.001 | 0.015 | With coating | 1.001 | 0.0325 | 0.185 | 0.0345 | 0.5 | 1.2 | 0.06 | 0.43 | 1155 1185 1215 1245 |
| III-4 | Without coating | 1.003 | 0.024 | 0.104 | 0.025 | Without coating | 1.003 | 0.066 | 0.328 | 0.075 | 0.3 | 1.2 | 0.08 | 0.43 | 1155 1185 1215 1245 |
| III-5 | With coating | 1.003 | 0.043 | 0.245 | 0.046 | With coating | 1.003 | 0.043 | 0.246 | 0.046 | 0.5 | 1.2 | 0.08 | 0.43 | 1155 1170 1185 1200 |
| *III-6 | With coating | 1.001 | 0.024 | 0.104 | 0.025 | With coating | 1.001 | 0.066 | 0.328 | 0.075 | 0.3 | 1.2 | 0.08 | 0 | 1155 1185 1215 1245 |

Sample marked '*' is out of the scope of the present invention.

TABLE 8

| Sample No. | Mean particle diameter of crystal grain (BT, BCTZ) after firing μm | Particle diameter (D90) of crystal grain (BT, BCTZ) after firing | A/B site ratio (A:Ba, Ca, B:Ti, Zr) | Electrostatic capacity μF | Relative dielectric constant | Rate of temperature change of electrostatic capacity at 125° C. % | High-temperature load test 125° C. 9.45 V. 1000 hours Defect |
|---|---|---|---|---|---|---|---|
| III-1 | 0.26 | 0.42 | 1.005 | 10 | 5850 | −17.6 | Nothing |
|  | 0.26 | 0.43 |  | 10.1 | 5900 | −17.4 | Nothing |
|  | 0.27 | 0.44 |  | 10.1 | 5910 | −17.6 | Nothing |
|  | 0.27 | 0.44 |  | 10.2 | 5950 | −17.4 | Nothing |
| III-2 | 0.27 | 0.43 | 1.005 | 10 | 5840 | −17.7 | Nothing |
|  | 0.28 | 0.45 |  | 10.1 | 5890 | −17.6 | Nothing |
|  | 0.28 | 0.46 |  | 10.1 | 5900 | −18 | Exist |
|  | 0.3 | 0.51 |  | 10.2 | 5950 | −18.6 | Exist |
| III-3 | 0.28 | 0.46 | 1.003 | 10.1 | 5860 | −17.8 | Nothing |
|  | 0.28 | 0.46 |  | 10.1 | 5870 | −17.8 | Nothing |
|  | 0.29 | 0.47 |  | 10.2 | 5910 | −17.9 | Nothing |
|  | 0.29 | 0.47 |  | 10.3 | 5930 | −18.2 | Nothing |
| III-4 | 0.3 | 0.51 | 1.005 | 10.8 | 6350 | −18.6 | Nothing |
|  | 0.31 | 0.52 |  | 10.8 | 6400 | −18.4 | Nothing |
|  | 0.32 | 0.55 |  | 10.8 | 6420 | −18.6 | Nothing |
|  | 0.34 | 0.59 |  | 10.8 | 6450 | −18.4 | Nothing |
| III-5 | 0.27 | 0.44 | 1.005 | 10 | 5850 | −17.6 | Nothing |
|  | 0.27 | 0.45 |  | 10.1 | 5910 | −17.4 | Nothing |
|  | 0.28 | 0.48 |  | 10.3 | 5920 | −17.9 | Nothing |
|  | 0.28 | 0.5 |  | 10.4 | 5950 | −18.1 | Nothing |
| *III-6 | 0.35 | 0.55 | 1.001 | 10 | 5850 | −20.3 | Exist |
|  | 0.37 | 0.59 |  | 10.1 | 5900 | −20.2 | Nothing |
|  | 0.41 | 0.68 |  | 10.1 | 5920 | −18.7 | Exist |
|  | 0.47 | 0.75 |  | 10.2 | 5960 | −21.8 | Exist |

Sample marked '*' is out of the scope of the present invention.

As apparent from the results of Tables 7 and 8, in the samples corresponding to the present invention, in which Mg, Y, and Mn were incorporated in BT powder and BCTZ powder, an the A/B site ratio in respect to Ba and Ti was not less than 1.003, except for Sample No. III-2 using glass powder containing a large amount of alumina, over the entire temperature region of samples fired at a firing temperature of 1155 to 1245° C., the relative dielectric constant was not less than 5850, the temperature characteristic was not more than −18.6% at 125° C. and within ±15% at −55° C. There was no defect in high-temperature load test.

On the other hand, the sample in which no barium carbonate was added to BT powder and BCTZ powder that were not more than 1.001 in the A/B site ratio, it exhibited approximately the same relative dielectric constant as the above samples of the invention, as the characteristic at 1215° C. in the firing temperatures of 1155 to 1245° C. However, the samples fired at a temperature higher than 1215° C., namely not less than 1245° C., or a temperature of 1155° C., had a large temperature characteristic of electrostatic capacity, so that a defect occurred in high-temperature load test.

Example IV (a)

The relationship between the characteristic and BCT powder and BCST powder along with the amount of addition of various additives was evaluated for a multilayer ceramic capacitor in the form of a monolayer. BCT powder and BSCT powder having a mean particle diameter of 0.4 μm were mixed at the ratio shown in Table 9, to prepare a mixed powder. To 100 mass parts of the mixed powder, powders of $MgCO_3$, $Y_2O_3$, $Tb_2O_3$, $Dy_2O_3$, $Ho_2O_3$, $Er_2O_3$, $Yb_2O_3$, $MnCO_3$, and $BaCO_3$ were added by the amounts indicated in Table 9, respectively.

In Table 9, the substitution amounts of Ca and Sr are indicated by the values of x, y, A, and B in the equations: $(Ba_{1-x}Ca_x)_A Ti_B O_3$; and $(Ba_{1-x-y}Sr_x Ca_y)_A Ti_B O_3$. Further, 1.2 mass parts of glass powder containing 0.08 mass % of alumina, 50 mol % of Si, 20 mol % of Ba, 20 mol % of Ca, and 10 mol % of $Li_2O$ was added to the total amount. This mixture was then subjected to wet mixing for 12 hours by a tumbling mill using $ZrO_2$ balls of 3 mm φ, with isopropanol (IPA) as solvent.

To dielectric powder so obtained, butyral resin and toluene were added to obtain a ceramic slurry. This slurry was then applied onto a PET film by doctor blade method. After drying for 15 seconds at 60° C. within a dryer, the slurry was peeled to form a ceramic green sheet of 9 μm thick, and 10 ceramic green sheets so obtained were laminated to form end ceramic green sheet layers. These end ceramic green sheet layers were dried at 90° C. for 30 minutes.

The end ceramic green sheet layer was placed on a base plate and adhered to the base plate by pressing it with a press machine.

Separately, the same ceramic slurry as above was applied onto a PET film by doctor blade method, and dried at 60° C. for 15 seconds, thereby preparing a plurality of ceramic green sheets of 2.0 μm thick.

An internal electrode paste was prepared by kneading with a triple-roll a mixture composed of the total amount of 45 weight % of Ni powder having a mean particle diameter of 0.2 μm, 5.5 weight % of ethyl cellulose, and 55 weight % of vehicle comprising 94.5 weight % of octyl alcohol.

Thereafter, on one surface of the obtained ceramic green sheet, the above mentioned internal electrode paste was printed in the form of an internal electrode pattern by using a screen-printing apparatus, so that a plurality of internal electrode patterns shaped as a rectangle having longer sides and shorter sides were formed on the green sheet followed by drying and peeling.

Subsequently, a piece of the green sheet with the internal electrode pattern formed thereon was laminated on the end ceramic green sheet layer, and then the end ceramic green sheet was laminated to prepare a capacitor body forming body.

The capacitor body forming body was then placed on a metal mold and pressed in the laminating direction by increasing pressure step by step through a pressure plate of a pressing machine. Thereafter, a rubber die was placed on the upper part of the capacitor body forming body, followed by hydrostatic pressure forming.

The resulting capacitor body forming body was then cut in a predetermined chip shape, and subjected to debinding process by heating to 260° C. in the atmosphere or to 500° C. in oxygen/nitrogen atmosphere of 0.1 Pa. Further, firing was performed at 1100 to 1245° C. in oxygen/nitrogen atmosphere of $10^{-7}$ Pa for two hours, and reoxidation treatment was performed at 1000° C. in oxygen/nitrogen atmosphere of $10^{-2}$ Pa, thereby obtaining an electronic component body. After firing, a Cu paste was baked at 800° C. on the end surface of the electronic component body, and Ni and Sn were plated to form an external terminal to be connected to the internal electrode.

The dielectric layer interposed between the internal electrodes of the multilayer ceramic capacitor so obtained had a thickness of 1.5 μm.

The dielectric layer constituting the above multilayer ceramic capacitor had the following relationship: $A_{BCT}/A_{BCST}$=0.7 to 1.2, where $A_{BCST}$ is the rate of BCST crystal grain, and $A_{BCT}$ is the rate of BCT grain terms of area ratio of each crystal grain in the crystal system of the cross-sectional of the dielectric layer. A rare earth element (yttrium) contained in the main crystal grain, exhibited the highest concentration at a grain boundary phase as a grain surface, and had a concentration gradient of not less than 0.05 atomic %/nm from the surface to the interior of the crystal grain.

The multilayer ceramic capacitors so obtained were obtained were evaluated in the same manner as in EXAMPLE I.

High-temperature load test (HALT lifetime) was conduced for 30 samples, and it was found as the shortest time in which insulation resistance value became not more than $1\times10^{-6}$ when a dc voltage of a voltage of 14.2 V (9.45 V/μm) was applied at a temperature 170° C.

The Sr concentration of an arbitrary location in the vicinity of the core was analyzed by using a transmission electron microscope and an EDS (elementary analysis apparatus). When Sr concentration was not less than 0.4 atomic % (round to one decimal), it was regarded as a BCST crystal grain having a high Sr concentration. Thus, 100 to 150 main crystal gains were analyzed.

TABLE 9

| Sample No. | BCT Ca amount x | BCT A/B ratio | BCST Ca amount x | BCST Sr amount y | BCST A/B ratio | BCT/BCST mole ratio | Additives MgCO$_3$ mass parts | Additives Y$_2$O$_3$ mass parts |
|---|---|---|---|---|---|---|---|---|
| *IV-1 | 0.01 | 1 | 0.05 | 0.01 | 1 | 1 | 0.31 | 0.73 |
| IV-2 | 0.01 | 1 | 0.05 | 0.01 | 1 | 1 | 0.31 | 0.73 |
| IV-3 | 0.005 | 1.003 | 0.05 | 0.01 | 1.003 | 1 | 0.31 | 0.73 |
| IV-4 | 0.01 | 1.003 | 0.005 | 0.01 | 1.003 | 1 | 0.31 | 0.73 |
| IV-5 | 0.01 | 1.003 | 0.01 | 0.005 | 1.003 | 1 | 0.31 | 0.73 |
| IV-6 | 0.01 | 1.003 | 0.01 | 0.01 | 1.003 | 1 | 0.31 | 0.73 |
| IV-7 | 0.01 | 1.003 | 0.05 | 0.01 | 1.003 | 1 | 0.31 | 0.73 |
| IV-8 | 0.01 | 1.003 | 0.05 | 0.05 | 1.003 | 1 | 0.31 | 0.73 |
| IV-9 | 0.01 | 1.003 | 0.10 | 0.05 | 1.003 | 1 | 0.31 | 0.73 |
| IV-10 | 0.01 | 1.003 | 0.10 | 0.10 | 1.003 | 1 | 0.31 | 0.73 |
| IV-11 | 0.05 | 1.003 | 0.05 | 0.05 | 1.003 | 1 | 0.31 | 0.73 |
| IV-12 | 0.05 | 1.003 | 0.10 | 0.05 | 1.003 | 1 | 0.31 | 0.73 |
| IV-13 | 0.05 | 1.003 | 0.10 | 0.10 | 1.003 | 1 | 0.31 | 0.73 |
| IV-14 | 0.05 | 1.003 | 0.10 | 0.05 | 1.003 | 0.05 | 0.31 | 0.73 |
| IV-15 | 0.05 | 1.003 | 0.10 | 0.05 | 1.003 | 0.3 | 0.31 | 0.73 |
| IV-16 | 0.05 | 1.003 | 0.10 | 0.05 | 1.003 | 3 | 0.31 | 0.73 |
| IV-17 | 0.05 | 1.003 | 0.10 | 0.05 | 1.003 | 20 | 0.31 | 0.73 |
| IV-18 | 0.05 | 1.003 | 0.10 | 0.05 | 1.003 | 1 | 0.31 | 0.73 |
| IV-19 | 0.05 | 1.003 | 0.10 | 0.05 | 1.003 | 1 | 0.31 | 0.73 |
| IV-20 | 0.05 | 1.003 | 0.10 | 0.05 | 1.003 | 1 | 0.93 | 0.73 |
| IV-21 | 0.05 | 1.003 | 0.10 | 0.05 | 1.003 | 1 | 0.31 | 1.45 |
| IV-22 | 0.05 | 1.003 | 0.10 | 0.05 | 1.003 | 1 | 0.31 | 1.7 |
| IV-23 | 0.05 | 1.003 | 0.10 | 0.05 | 1.003 | 1 | 0.31 | 0 |
| IV-24 | 0.05 | 1.003 | 0.10 | 0.05 | 1.003 | 1 | 0.31 | 0 |
| IV-25 | 0.05 | 1.003 | 0.10 | 0.05 | 1.003 | 1 | 0.31 | 0 |
| IV-26 | 0.05 | 1.003 | 0.10 | 0.05 | 1.003 | 1 | 0.31 | 0 |
| IV-27 | 0.05 | 1.003 | 0.10 | 0.05 | 1.003 | 1 | 0.31 | 0 |
| IV-28 | 0.05 | 1.003 | 0.10 | 0.05 | 1.003 | 1 | 0.31 | 0 |
| IV-29 | 0.10 | 1.003 | 0.10 | 0.05 | 1.003 | 0.3 | 0.31 | 0.73 |
| IV-30 | 0.10 | 1.003 | 0.10 | 0.05 | 1.003 | 1 | 0.31 | 0.73 |
| IV-31 | 0.10 | 1.003 | 0.10 | 0.05 | 1.003 | 3 | 0.31 | 0.73 |

| Sample No. | Additives Tb$_2$O$_3$ mass parts | Dy$_2$O$_3$ mass parts | Ho$_2$O$_3$ mass parts | Er$_2$O$_3$ mass parts | Yb$_2$O$_3$ mass parts | MnCO$_3$ mass parts | BaCO$_3$ mass parts |
|---|---|---|---|---|---|---|---|
| *IV-1 | 0 | 0 | 0 | 0 | 0 | 0.16 | 0 |
| IV-2 | 0 | 0 | 0 | 0 | 0 | 0.16 | 0.25 |
| IV-3 | 0 | 0 | 0 | 0 | 0 | 0.16 | 0.5 |
| IV-4 | 0 | 0 | 0 | 0 | 0 | 0.16 | 0.5 |
| IV-5 | 0 | 0 | 0 | 0 | 0 | 0.16 | 0.5 |

TABLE 9-continued

|  |  |  |  |  |  |  |  |
|---|---|---|---|---|---|---|---|
| IV-6 | 0 | 0 | 0 | 0 | 0 | 0.16 | 0.5 |
| IV-7 | 0 | 0 | 0 | 0 | 0 | 0.16 | 0.5 |
| IV-8 | 0 | 0 | 0 | 0 | 0 | 0.16 | 0.5 |
| IV-9 | 0 | 0 | 0 | 0 | 0 | 0.16 | 0.5 |
| IV-10 | 0 | 0 | 0 | 0 | 0 | 0.16 | 0.5 |
| IV-11 | 0 | 0 | 0 | 0 | 0 | 0.16 | 0.5 |
| IV-12 | 0 | 0 | 0 | 0 | 0 | 0.16 | 0.6 |
| IV-13 | 0 | 0 | 0 | 0 | 0 | 0.16 | 0.5 |
| IV-14 | 0 | 0 | 0 | 0 | 0 | 0.16 | 0.5 |
| IV-15 | 0 | 0 | 0 | 0 | 0 | 0.16 | 0.5 |
| IV-16 | 0 | 0 | 0 | 0 | 0 | 0.16 | 0.5 |
| IV-17 | 0 | 0 | 0 | 0 | 0 | 0.16 | 0.5 |
| IV-18 | 0 | 0 | 0 | 0 | 0 | 0.16 | 0.8 |
| IV-19 | 0 | 0 | 0 | 0 | 0 | 0.16 | 0.5 |
| IV-20 | 0 | 0 | 0 | 0 | 0 | 0.16 | 0.5 |
| IV-21 | 0 | 0 | 0 | 0 | 0 | 0.16 | 0.5 |
| IV-22 | 0 | 0 | 0 | 0 | 0 | 0.16 | 0.5 |
| IV-23 | 0.73 | 0 | 0 |  | 0 | 0.16 | 0.5 |
| IV-24 | 0 | 0.73 | 0 | 0 | 0 | 0.16 | 0.5 |
| IV-25 | 0 | 0 | 0.73 | 0 | 0 | 0.16 | 0.5 |
| IV-26 | 0 | 0 | 0 | 0.73 | 0 | 0.16 | 0.5 |
| IV-27 | 0 | 0 | 0 | 0 | 0.73 | 0.16 | 0.5 |
| IV-28 | 0 | 0 | 0 | 0 | 0 | 0.32 | 0.5 |
| IV-29 | 0 | 0 | 0 | 0 | 0 | 0.16 | 0.5 |
| IV-30 | 0 | 0 | 0 | 0 | 0 | 0.16 | 0.5 |
| IV-31 | 0 | 0 | 0 | 0 | 0 | 0.16 | 0.6 |

Sample marked '*' is out of the scope of the present invention.

TABLE 10

| Sample No. | Firing temperature (° C.) | A/B ratio of dielectric layer | Mean particle diameter BCT (μm) | Mean particle diameter BCST (μm) | Relative dielectric constant (20° C.) | TCC (%) −25° C. | TCC (%) 85° C. | HALT lifetime (hr) 170° C., 9.45 V/μm |
|---|---|---|---|---|---|---|---|---|
| *IV-1 | 1200 | 1 | 0.26 | 0.24 | 2480 | −17 | 2 | 4.5 |
| IV-2 | 1200 | 1.003 | 0.24 | 0.24 | 2560 | −16 | 2 | 6 |
| IV-3 | 1200 | 1.008 | 0.2 | 0.2 | 3240 | −5 | 1 | 12 |
| IV-4 | 1180 | 1.008 | 0.2 | 0.2 | 2700 | −13 | 2 | 13 |
| IV-5 | 1220 | 1.008 | 0.2 | 0.2 | 3150 | −14 | −1 | 13 |
| IV-6 | 1200 | 1.008 | 0.2 | 0.2 | 2700 | −5 | −4 | 14 |
| IV-7 | 1190 | 1.008 | 0.2 | 0.2 | 3600 | −12 | −14 | 14 |
| IV-8 | 1180 | 1.008 | 0.2 | 0.2 | 3095 | −8.5 | −9 | 18 |
| IV-9 | 1230 | 1.008 | 0.2 | 0.2 | 3200 | −7 | 2 | 20 |
| IV-10 | 1245 | 1.008 | 0.2 | 0.2 | 2780 | −5 | −4.5 | 24 |
| IV-11 | 1200 | 1.008 | 0.2 | 0.2 | 3500 | −8 | −9 | 20 |
| IV-12 | 1220 | 1.008 | 0.2 | 0.2 | 3650 | −4 | −9.6 | 22 |
| IV-13 | 1200 | 1.008 | 0.2 | 0.2 | 3400 | −7 | −7.5 | 22 |
| IV-14 | 1220 | 1.008 | 0.2 | 0.2 | 3500 | −11 | 3 | 17 |
| IV-15 | 1200 | 1.008 | 0.2 | 0.2 | 3250 | −9 | 1 | 19 |
| IV-16 | 1200 | 1.008 | 0.2 | 0.2 | 2900 | −3 | −8 | 25 |
| IV-17 | 1180 | 1.008 | 0.2 | 0.2 | 2650 | −2 | −12 | 25 |
| IV-18 | 1120 | 1.011 | 0.10 | 0.10 | 2450 | −7 | −4.5 | 26 |
| IV-19 | 1180 | 1.008 | 0.30 | 0.30 | 3200 | −7 | −4.5 | 18 |
| IV-20 | 1150 | 1.008 | 0.2 | 0.2 | 3100 | −3.5 | −8.5 | 20 |
| IV-21 | 1220 | 1.008 | 0.2 | 0.2 | 2740 | −6 | −7 | 26 |
| IV-22 | 1240 | 1.008 | 0.2 | 0.2 | 2650 | −5 | −4.5 | 28 |
| IV-23 | 1180 | 1.008 | 0.2 | 0.2 | 3010 | −9 | −8 | 14 |
| IV-24 | 1180 | 1.008 | 0.2 | 0.2 | 3100 | −9 | −9 | 12 |
| IV-25 | 1180 | 1.008 | 0.2 | 0.2 | 3100 | −6 | −8 | 13 |
| IV-26 | 1180 | 1.008 | 0.2 | 0.2 | 3050 | −9.5 | −8 | 13 |
| IV-27 | 1180 | 1.008 | 0.2 | 0.2 | 3200 | −9.5 | −9.5 | 14 |
| IV-28 | 1200 | 1.008 | 0.2 | 0.2 | 3000 | −6 | −5.5 | 14 |
| IV-29 | 1150 | 1.008 | 0.2 | 0.2 | 2780 | −7 | −7.7 | 16 |
| IV-30 | 1170 | 1.008 | 0.2 | 0.2 | 2550 | −9 | −9 | 22 |
| IV-31 | 1150 | 1.008 | 0.2 | 0.2 | 2260 | −9 | −9 | 20 |

Sample marked '*' is out of the scope of the present invention.

As apparent from the results of Tables 9 and 10, the relative dielectric constant and temperature characteristic and high-temperature load test characteristic were improved by using the BCST crystal grain and the BCT crystal grain, satisfying the relationship of: A/B≧1.003 in mole ratio, specifically the ratio of A site consisting of barium, Ca, and Sr to B site consisting of titanium.

On the other hand, the sample that was 1.00 in the A/B site ratio had a large temperature characteristic of relative dielectric constant. The duration time of the high-temperature load test characteristic (HALT) was as short as not more than six hours.

Example IV (b)

Sample No. IV-13 in EXAMPLE IV (a) was changed as follows. That is, 200 dielectric layers were laminated, and the firing temperature was 1200 to 1240° C. The A/B site ratio, and the amount of addition of BACO₃ in BCT powder and BCST powder were changed as indicated in Table 11. Samples were obtained under the same firing conditions as in EXAMPLE IV (a), and evaluated similarly. As comparative examples, samples were prepared by allowing BCT powder and BCST powder to have 1 in the A/B site ratio, and by adding no BaCO₃. Tables 11 and 12 show the results.

As apparent from the results of Tables 11 and 12, in the samples in which Mg, Y, and Mn were incorporated in BCT powder and BCST powder, and the A/B site ratio in respect to Ba and Ti was not less than 1.003, over the entire temperature region of samples fired at a firing temperature of 1200 to 1240° C., the relative dielectric constant was not less than 3810, and the temperature characteristic of relative dielectric constant was not more than −9.8% at 85° C. The duration time in high-temperature load test (85° C., 9.45 V/μm) was not less than 1000 hours. The sample made by a great number of laminations had a higher relative dielectric constant than the sample made by a single lamination.

On the other hand, the sample, in which no barium carbonate was added to BCT powder and BCST powder that was not more than 1.001 in the A/B site ratio, had a low relative dielectric constant in the temperature region where firing was performed at a firing temperature of 1200 to 1240° C. The duration time in high-temperature load test was not more than 1000 hours.

Example V

A multilayer ceramic capacitor was manufactured as follows. Table 13 shows the type, mean particle diameter, and amount of addition of raw material powders, and firing tem-

TABLE 11

| Sample No. | BCT powder A/B ratio | BCST powder A/B ratio | Additives Amount of addition | | | | Firing temperature (° C.) |
| --- | --- | --- | --- | --- | --- | --- | --- |
| | | | Mg mass parts | Y mass parts | Mn mass parts | BaCO₃ mass parts | |
| IV-32 | 1.003 | 1.003 | 0.31 | 0.73 | 0.16 | 0.5 | 1220 |
| | | | | | | | 1220 |
| | | | | | | | 1240 |
| IV-33 | 1.003 | 1.003 | 0.31 | 0.73 | 0.16 | 0.4 | 1200 |
| | | | | | | | 1220 |
| | | | | | | | 1240 |
| IV-34 | 1.002 | 1.003 | 0.31 | 0.73 | 0.16 | 0.2 | 1200 |
| | | | | | | | 1220 |
| | | | | | | | 1240 |
| *IV-35 | 1 | 1 | 0.31 | 0.73 | 0.16 | 0 | 1200 |
| | | | | | | | 1220 |
| | | | | | | | 1240 |

Sample marked '*' is out of the scope of the present invetion.

TABLE 12

| Sample No. | Mean particle diameter of crystal grain (BCT, BCST) after firing μm | Particle diameter (D90) of crystal grain (BCT, BCST) after firing μm | A/B site ratio (A:Ba, Ca, Sr, B:Ti) | Relative dielectric constant | Rate of temperature change of electrostatic capacity at 85° C. % | High-temperature load test 85° C., 9.45 V, 1000 hours Defect |
| --- | --- | --- | --- | --- | --- | --- |
| IV-32 | 0.2 | 0.42 | 1.008 | 3940 | −9.7 | Nothing |
| | 0.2 | 0.44 | | 4020 | −9.5 | Nothing |
| | 0.21 | 0.44 | | 3880 | −8.4 | Nothing |
| IV-33 | 0.19 | 0.43 | 1.005 | 3880 | −9.8 | Nothing |
| | 0.2 | 0.46 | | 3990 | −9.2 | Nothing |
| | 0.21 | 0.51 | | 4050 | −8.7 | Nothing |
| IV-34 | 0.2 | 0.43 | 1.003 | 3900 | −9.6 | Nothing |
| | 0.21 | 0.47 | | 3850 | −9.3 | Nothing |
| | 0.22 | 0.52 | | 3810 | −8.5 | Nothing |
| *IV-35 | 0.25 | 0.66 | 1 | 2780 | 2 | Exist |
| | 0.27 | 0.7 | | 2780 | 2 | Exist |
| | 0.29 | 0.71 | | 2680 | 3.3 | Exist |

Sample marked '*' is out of the scope of the present invention.

perature. The BCT powder and the BCTZ powder used herein had the same mole, and each A/B site ratio was 1.001 or 1.003. The particle diameter of the main body of the BCT and the BCTZ powder was 0.2 to 0.4 μm. The BCTZ powder had a composition of $(Ba_{0.95}Ca_{0.05})_m(Ti_{0.8}Zr_{0.2})O_3$. The BCT powder had a composition of $(Ba_{0.95}Ca_{0.05})TiO_3$. The glass powder had the content of alumina as shown in Table 13, and its composition was as follows: $SiO_2$=50; BaO=20; CaO=20; and $Li_2O$=10 (mol %). In Table 13, the terms "with coating" and "without coating" indicate whether or not BCT powder and BCTZ powder had a coating of an oxide of Mg, Y, and Mn.

Wet mixing of the above powders was performed using zirconia balls having a diameter of 5 mm. A mixed solvent of toluene and alcohol was added thereto. To the obtained powder, polyvinyl butyral resin and a mixed solvent of toluene and alcohol were added, followed by a similar wet mixing using zirconia balls having a diameter of 5 mm, thereby preparing a ceramic slurry. A ceramic green sheet having a thickness of 3 μm was prepared by doctor blade method.

A plurality of rectangular internal electrode patterns mainly composed of Ni were formed on the upper surface of the ceramic green sheet and a ceramic pattern having the same ceramic composition as the ceramic green sheet was formed therearound at substantially the same height. In a conductor paste used in the internal electrode pattern, the mean particle diameter of Ni powder was 0.3 μm, and 30 mass parts of BCT powder used as a common material in the green sheet was added to 100 mass parts of the Ni powder.

Subsequently, 360 ceramic green sheets with an internal electrode pattern printed thereon were laminated to obtain a laminate. Then, 20 ceramic green sheets free from an internal electrode pattern were laminated on the upper and lower surfaces of the laminate, respectively, and then subjected to batch laminating with a press machine under the conditions of: 60° C. in temperature, $10^7$ Pa in pressure and 10 minutes in time. The obtained laminate was then cut in predetermined dimensions to obtain a multilayer forming body.

The obtained multilayer forming body was subjected to debinding process at a temperature raising rate of 10° C./h and at 300° C. in the atmosphere. With the temperature raising rate from 500° C. set at 300° C./h, firing was performed at 1155 to 1245° C. (oxygen partial pressure of $10^{-6}$ Pa) for two hours, followed by cooling down to 1000° C. at a temperature lowering rate of 300° C./h, and reoxidation treatment at 1000° C. in nitrogen atmosphere for four hours, and cooling at a temperature lowering rate of 300° C./h. Thus, a capacitor body was prepared. This capacitor body had a size of 2×1.3× 1.3 $mm^3$, and a dielectric layer had a thickness of 2 μm.

After the fired electronic component body was subjected to barrel polishing, external electrode paste containing Cu powder and glass powder was applied to both ends of the electronic component body, followed by baking at 850° C. to form external electrodes. Thereafter, with an electrolytic barrel machine, Ni and Sn were plated in this order on the surfaces of the external electrodes, resulting in a multilayer ceramic capacitor.

The dielectric layer constituting the above multilayer ceramic capacitor had the following relationship: $A_{BCT}/A_{BCTZ}$=0.8 to 1.2, where $A_{BCTZ}$ is the rate of BCTZ crystal grain, and $A_{BCT}$ is the rate of BCT crystal grain in terms of area ratio of each crystal grain in the crystal system of the cross-sectional of the dielectric layer. A rare earth element (yttrium) contained in barium titanate crystal grain exhibited the highest concentration at a grain boundary phase as a grain surface, and had a concentration gradient of not less than 0.05 atomic %/nm from the surface to the interior of the crystal grain.

The multilayer ceramic capacitors so obtained were evaluated for 100 samples in the same manner as in EXAMPLE I.

The mean particle diameter of BCT crystal grains and BCTZ crystal grains constituting the dielectric layer was found by a scanning electron microscope (SEM). After etching the polished surface, 20 crystal grains were randomly selected from the microphotograph, and the maximum diameter of each crystal grain was found by intercept method, and the average value and D90 (a 90% accumulated value from small diameter to large diameter) were found. This was conductor for five samples.

The Ca and Zr concentrations of an arbitrary location in the vicinity of the core were analyzed by using a transmission electron microscope and an EDS (elementary analysis apparatus). When each of Ca concentration and Zr concentration was not less than 0.4 atomic % (round to one decimal), it was regarded as a dielectric particle having a high Ca concentration and a high Zr concentration. Thus, 100 to 150 main crystal grains per sample were analyzed.

TABLE 13

| Sample No. | BCT powder | | | | | BCTZ powder | | | | | Glass powder | | | | Firing temperature ° C. |
|---|---|---|---|---|---|---|---|---|---|---|---|---|---|---|---|
| | | | Amount of addition | | | | | Amount of addition | | | Mean particle diameter μm | Amount of addition mass parts | Alumina mass % | $BaCO_3$ mass parts | |
| | Coating | A/B | Mg mass parts | Y mass parts | Mn mass parts | Coating | A/B | Mg mass parts | Y mass parts | Mn mass parts | | | | | |
| V-1 | With coating | 1.003 | 0.024 | 0.104 | 0.025 | With coating | 1.003 | 0.065 | 0.328 | 0.075 | 0.3 | 1.2 | 0.08 | 0.43 | 1155 1185 1215 1245 |
| V-2 | With coating | 1.003 | 0.024 | 0.104 | 0.025 | With coating | 1.003 | 0.065 | 0.328 | 0.075 | 0.3 | 1.2 | 1.5 | 0.43 | 1155 1185 1215 1245 |
| V-3 | With coating | 1.001 | 0.011 | 0.051 | 0.115 | With coating | 1.001 | 0.0325 | 0.185 | 0.0345 | 0.5 | 1.2 | 0.08 | 0.43 | 1155 1185 1215 1245 |

TABLE 13-continued

| | BCT powder | | | | | BCTZ powder | | | | | Glass powder | | | | |
|---|---|---|---|---|---|---|---|---|---|---|---|---|---|---|---|
| | | | Amount of addition | | | | | Amount of addition | | | Mean | Amount of | | | Firing |
| Sample No. | Coating | A/B | Mg mass parts | Y mass parts | Mn mass parts | Coating | A/B | Mg mass parts | Y mass parts | Mn mass parts | particle diameter μm | addition mass parts | Alumina mass % | BaCO₃ mass parts | temperature °C. |
| V-4 | Without coating | 1.003 | 0.024 | 0.104 | 0.025 | Without coating | 1.003 | 0.088 | 0.328 | 0.075 | 0.3 | 1.2 | 0.08 | 0.43 | 1155<br>1185<br>1215<br>1245 |
| V-5 | With coating | 1.003 | 0.043 | 0.246 | 0.046 | With coating | 1.003 | 0.043 | 0.248 | 0.046 | 0.5 | 1.2 | 0.08 | 0.43 | 1155<br>1170<br>1185<br>1200 |
| *V-6 | With coating | 1.001 | 0.024 | 0.104 | 0.025 | With coating | 1.001 | 0.088 | 0.328 | 0.075 | 0.3 | 1.2 | 0.08 | 0 | 1155<br>1185<br>1215<br>1245 |

Sample marked '*' is out of the scope of the present invention.

TABLE 14

| Sample No. | Mean particle diameter of crystal grain (BCT, BCTZ) after firing μm | Particle diameter (D90) of crystal grain (BCT, BCTZ) after firing | A/B site ratio (A:Ba, Ca, B: Ti, Zr) | Electrostatic capacity μF | Relative dielectric constant | Rate of temperature change of electrostatic capacity at 125° C. % | High-temperature load test 125° C. 9.45 V, 1000 hours Defect |
|---|---|---|---|---|---|---|---|
| V-1 | 0.29 | 0.46 | 1.005 | 11.0 | 6448 | −14.1 | Nothing |
| | 0.29 | 0.47 | | 11.1 | 6511 | −13.9 | Nothing |
| | 0.30 | 0.48 | | 11.1 | 6511 | −14.1 | Nothing |
| | 0.30 | 0.48 | | 11.2 | 6575 | −13.9 | Nothing |
| V-2 | 0.29 | 0.47 | 1.005 | 11.0 | 6440 | −14.2 | Nothing |
| | 0.30 | 0.49 | | 11.1 | 6500 | −14.2 | Nothing |
| | 0.31 | 0.50 | | 11.1 | 6505 | −14.4 | Nothing |
| | 0.32 | 0.52 | | 11.2 | 6570 | −14.8 | Exist |
| V-3 | 0.31 | 0.51 | 1.003 | 11.1 | 6511 | −14.2 | Nothing |
| | 0.31 | 0.51 | | 11.1 | 6511 | −14.2 | Nothing |
| | 0.32 | 0.52 | | 11.2 | 6575 | −14.3 | Nothing |
| | 0.32 | 0.52 | | 11.4 | 6640 | −14.6 | Nothing |
| V-4 | 0.33 | 0.56 | 1.005 | 11.9 | 6962 | −14.9 | Nothing |
| | 0.34 | 0.57 | | 11.9 | 6962 | −14.7 | Nothing |
| | 0.35 | 0.61 | | 12.0 | 7027 | −14.9 | Nothing |
| | 0.37 | 0.65 | | 12.0 | 7027 | −14.7 | Nothing |
| V-5 | 0.30 | 0.48 | 1.005 | 11.0 | 6446 | −14.1 | Nothing |
| | 0.30 | 0.50 | | 11.1 | 6511 | −13.9 | Nothing |
| | 0.31 | 0.53 | | 11.4 | 6540 | −14.3 | Nothing |
| | 0.31 | 0.55 | | 11.5 | 6704 | −14.5 | Nothing |
| *V-6 | 0.39 | 0.61 | 1.001 | 11.0 | 6448 | −16.2 | Exist |
| | 0.41 | 0.65 | | 11.1 | 6511 | −16.2 | Nothing |
| | 0.45 | 0.75 | | 11.1 | 6511 | −15.0 | Exist |
| | 0.52 | 0.83 | | 11.2 | 6575 | −17.4 | Exist |

Sample marked '*' is out of the scope of the present invention.

As apparent from the results of Tables 13 and 14, in the samples corresponding to the present invention, in which Mg, Y, and Mn were incorporated in BCT powder and BCTZ powder, an the A/B site ratio in respect to Ba and Ti was not less than 1.003, except for Sample No. V-2 using glass powder containing a large amount of alumina, over the entire temperature region of samples fired at a firing temperature of 1155 to 1245° C., the relative dielectric constant was not less than 6440, the temperature characteristic was not more than −14.9% at 125° C., and within ±15% at −55° C. There was no defect in high-temperature load test. In addition, according to the present invention, more excellent characteristic obtained by arranging such that the BCTZ powder had more coating of Mg, Y, and Mn than the BCT powder.

On the other hand, in the sample in which BCT powder and BCTZ powder were not more than 1.001 in the A/B site ratio, and no barium carbonate was added thereto, it exhibited approximately the same relative dielectric constant as the above samples of the invention, as the characteristic at 1215° C. in the firing temperatures of 1155 to 1245° C. However, the samples fired at a temperature higher than 1215° C., or at 1155° C. had a large temperature characteristic of electrostatic capacity, so that a defect occurred in high-temperature load test.

What is claimed is:

1. A multilayer ceramic capacitor comprising a capacitor body formed by alternately laminating a dielectric layer and an internal electrode layer, and an external electrode formed on both ends of the capacitor body, wherein the dielectric layer comprises a grain boundary phase and at least two types of crystal grains that comprise Ba and Ti as main components, and differ from one another in Ca component concentration, and the crystal grains contains Mg, a rare earth element, and Mn, and satisfy the relationship of A/Ba≧1.003 in mole ratio, where A is a sum of Ba and Ca; and B is an amount of Ti.

2. The multilayer ceramic capacitor according to claim 1, wherein the crystal grains comprises a BT crystal grain that is not more than 0.2 atomic % in Ca component concentration, and a BCT crystal grain that is not less than 0.4 atomic % in Ca component concentration, and satisfy the relationship of A/B≧1.003 in mole ratio, where A is an amount of Ba and Ca in the BCT crystal grain; and B is an amount of Ti.

3. The multilayer ceramic capacitor according to claim 2, wherein the BT crystal grain and the BCT crystal grain are perovskite barium titanate crystal grains that differ from one another in Ca component concentration.

4. The multilayer ceramic capacitor according to claim 2, wherein a total concentration of Mg, a rare earth element, and Mn contained in the BCT crystal grain is higher than a total concentration of Mg, a rare earth element, and Mn contained in the BT crystal grain.

5. The multilayer ceramic capacitor according to claim 1, containing, in terms of oxide, 0.04 to 0.14 mass parts of Mg, 0.2 to 0.9 mass parts of a rare earth element, and 0.04 to 0.15 mass parts of Mn, to 100 mass parts of a sum of an oxide of Ba, Ti and Ca forming the crystal grains.

6. The multilayer ceramic capacitor according to claim 1, wherein when the multilayer ceramic capacitor is exposed to a high-temperature load atmosphere having a higher temperature than a Curie temperature exhibited by a crystal grain constituting a dielectric layer, and applying a voltage not less than one third a rate voltage of the multilayer ceramic capacitor, a resistance decrease rate of a grain boundary in the dielectric layer is not more than 0.7%/min. alternating current impedance measurement before and after being exposed.

7. A multilayer ceramic capacitor comprising a capacitor body formed by alternately laminating a dielectric layer and an internal electrode layer, and an external electrode formed on both ends of the capacitor body, wherein the dielectric layer comprises a grain boundary phase and at least two types of crystal grains that Ba and Ti as main components, and differ from one another in Sr component concentration, and the crystal grains contains Mg, a rare earth element, and Mn, and satisfy the relationship of A/B≧1.003 in mole ratio, where A is a sum of Ba and Sr; and B is an amount of Ti.

8. The multilayer ceramic capacitor according to claim 7, wherein the crystal grains comprise a BT crystal grain that is not more than 0.2 atomic % in Sr component concentration, and a BST crystal grain that is not less than 0.4 atomic % in Sr component concentration, and satisfy the relationship of A/B≧1.003 in mole ratio, where A is a sum of Ba and Sr in the BST crystal grain; and B is an amount of Ti.

9. The multilayer ceramic capacitor according to claim 8, wherein a total concentration of Mg, a rare earth element, and Mn contained in the BST crystal grain is higher than a total concentration of Mg, a rare earth element, and Mn contained in the BT crystal grain.

10. A multilayer ceramic capacitor comprising a capacitor body formed by alternately laminating a dielectric layer and an internal electrode layer, and an external electrode formed on both ends of the capacitor body, wherein the dielectric layer comprises a grain boundary phase and at least two types of crystal grains that comprise Ba and Ti as main components, and differ from one another in Ca component concentration and Zr component concentration, and the crystal grains containing Mg, a rare earth element, and Mn, and satisfy the relationship of A/B≧1.003 in mole ratio, where A is a sum of Ba and Ca in the dielectric layer; and B is a sum of Ti and Zr.

11. The multilayer ceramic capacitor according to claim 10, wherein the crystal grains comprises a BT crystal grain that is not more than 0.2 atomic % in Ca composition concentration, and a BCTZ crystal grain that is not less than 0.4 atomic % in Ca composition concentration, and satisfy the relationship of A/B≧1.003 in mole ratio, where A is a sum of Ba and Ca in the BCTZ crystal grain; and B is a sum of Ti and Zr.

12. The multilayer ceramic capacitor according to claim 11, wherein a total concentration of Mg, a rare earth element, and Mn contained in a BCTZ crystal grain is higher than a total concentration of Mg, a rare earth element, and Mn contained in a BT crystal grain.

13. A multilayer ceramic capacitor comprising a capacitor body formed by alternately laminating a dielectric layer and an internal electrode layer, and an external electrode formed on both ends of the capacitor body, wherein the dielectric layer comprises a grain boundary phase and at least two types of crystal grains that comprise Ba and Ti as main components, and differ from one another in Ca component concentration and Sr component concentration, and satisfy the relationship of A/B≧1.003 in mole ratio, where A is a sum of Ba, Ca, and Sr in the dielectric layer; and B is an amount of Ti.

14. The multilayer ceramic capacitor according to claim 13, wherein the at least two types of crystal grains comprises a BCT crystal grain that is not less than 0.4 atomic % in Ca component concentration and not more than 0.2 atomic % in Sr component concentration and a BCST crystal grain that is not less than 0.4 atomic % in Ca component concentration and not less than 0.4 atomic % in Sr component concentration.

15. The multilayer ceramic capacitor according to claim 14, wherein at least one of the BCT crystal grain and the BCST crystal grain satisfies the relationship of A/B≧1.003 in mole ratio, where A a sum of Ba, Ca, and Sr; and B is an amount of Ti.

16. The multilayer ceramic capacitor according to claim 13, containing, in terms of oxide, 0.05 to 0.6 mass parts of Mg, 0.1 to 1.7 mass parts of a rare earth element, and 0.1 to 0.5 mass parts of Mn, to 100 mass parts of a sum, in terms of oxide, of Ba, Ca, Sr, and Ti that constitute the crystal grain.

17. A multilayer ceramic capacitor comprising a capacitor body formed by alternately laminating a dielectric layer and an internal electrode layer, and an external electrode formed on both ends of the capacitor body, wherein the dielectric layer comprises a grain boundary phase and a BCT crystal grain that comprises Ba and Ti as main components, and is not less than 0.4 atomic % in Ca component concentration and not more than 0.2 atomic % in Zr component concentration, and a BCTZ crystal grain that comprises Ba and Ti as main components, and is not less than 0.4 atomic % in Ca component concentration and not less than 0.4 atomic % in Zr component concentration, and satisfies the relationship of A/B≧1.003 in mole ratio, where A is a sum of Ba and Ca in the dielectric layer; and B is a sum of Ti and Zr.

18. The multilayer ceramic capacitor according to claim 17, satisfying the relationship of A/B≧1.003 in mole ratio, where A is a sum of Ba and Ca in at least one of the BCT crystal grain and the BCTZ crystal grain; and B is a sum of Ti and Zr.

19. The multilayer ceramic capacitor according to claim 18, wherein a total concentration of Mg, a rare earth element, and Mn contained in the BCTZ crystal grain is higher than a total concentration of Mg, a rare earth element, and Mn contained in the BCT crystal grain.

* * * * *